(12) United States Patent
Sasaki et al.

(10) Patent No.: US 8,358,487 B2
(45) Date of Patent: Jan. 22, 2013

(54) THIN-FILM MAGNETIC HEAD HAVING COIL OF VARYING THINKNESSES IN SPACES ADJACENT THE MAIN MAGNETIC POLE

(75) Inventors: Yoshitaka Sasaki, Milpitas, CA (US); Hiroyuki Ito, Milpitas, CA (US); Kazuki Sato, Milpitas, CA (US); Atsushi Iijima, Shatin (CN)

(73) Assignees: Headway Technologies, Inc., Milpitas; SAE Magnetics (H.K.) Ltd., Hong Kong (CN)

( * ) Notice: Subject to any disclaimer, the term of this patent is extended or adjusted under 35 U.S.C. 154(b) by 198 days.

(21) Appl. No.: 12/984,793

(22) Filed: Jan. 5, 2011

(65) Prior Publication Data
US 2012/0170154 A1 Jul. 5, 2012

(51) Int. Cl.
*G11B 5/17* (2006.01)
(52) U.S. Cl. ............ 360/123.08; 360/123.2; 360/123.41
(58) Field of Classification Search . 360/123.01–123.61
See application file for complete search history.

(56) References Cited

U.S. PATENT DOCUMENTS

| 4,656,546 | A | 4/1987 | Mallory |
| 4,672,493 | A | 6/1987 | Schewe |
| 6,504,675 | B1 | 1/2003 | Shukh et al. |
| 6,927,939 | B2 * | 8/2005 | Sasaki et al. ............ 360/125.67 |
| 7,085,099 | B2 * | 8/2006 | Sasaki et al. ............ 360/123.41 |
| 7,174,621 | B2 * | 2/2007 | Sato et al. ............ 29/603.13 |

FOREIGN PATENT DOCUMENTS

| JP | A-2002-208111 | 7/2002 |
| JP | A-2004-94997 | 3/2004 |
| JP | A-2009-295262 | 12/2009 |

* cited by examiner

*Primary Examiner* — Allen Heinz
(74) *Attorney, Agent, or Firm* — Oliff & Berridge, PLC

(57) ABSTRACT

A thin-film magnetic head is constructed such that a main magnetic pole layer, a write shield layer, a gap layer, and a thin-film coil are laminated on a substrate. The thin-film coil has a coil-layer. The coil-layer has a turn part arranged closer to an ABS than is a rear end part of the main magnetic pole layer farthest from the ABS. Regarding a substrate side coil-layer, arranged between the main magnetic pole layer and the substrate, of the coil-layer, a thickness of a non-corresponding magnetic pole part other than a magnetic pole corresponding part corresponding to an arrangement space of the main magnetic pole layer is larger than a thickness of the magnetic pole corresponding part.

14 Claims, 33 Drawing Sheets

Fig.19

THIN-FILM MAGNETIC HEAD HAVING COIL OF VARYING THINKNESSES IN SPACES ADJACENT THE MAIN MAGNETIC POLE

BACKGROUND

1. Field of the Invention

The present invention relates to a thin-film magnetic head which performs a magnetic recording action by a perpendicular recording scheme, a method of manufacturing the same, a head gimbal assembly, and a hard disk drive

2. Related Background Art

In recent years, hard disk drives have remarkably been improving their areal recording density. The areal recording density of hard disk drives has recently reached and is about to exceed 160 to 200 GB/platter in particular. In keeping with this trend, thin-film magnetic heads have been required to improve their performances.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Conventional thin-film magnetic heads of perpendicular magnetic recording type are disclosed in U.S. Pat. Nos. 6,504,675 (referred also to as patent document 1), 4,656,546 (referred also to as patent document 2), and 4,672,493 (referred also to as patent document 3) and Japanese Patent Application Laid-Open No. 2004-94997 (referred also to as patent document 4), for example.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer. As a conventional PMR, PMR 400 as illustrated in FIG. 33 has been known. This PMR 400 includes a main magnetic pole layer 402 which is formed on an insulating layer 401 and has a bevel-shaped magnetic pole end part disposed on the side of an medium-opposing surface (referred also to as air bearing surface, ABS) 403; a write shield layer 405 which is magnetically connected to the main magnetic pole layer 402 and opposes the main magnetic pole layer 402 by way of a recording gap layer 404 on the ABS 403 side; and a thin-film coil 406.

The thin-film coil 406 is wound in a planar spiral about a junction part 408 connecting the main magnetic pole layer 402 and the write shield layer 405, while its windings are insulated from each other by a coil-insulating layer 407. Further, the PMR 400 has a reproducing head 409.

SUMMARY OF THE INVENTION

The conventional PMR causes a current to flow through the thin-film coil, so as to generate a magnetic field, thereby recording data onto the recording medium. In the case of the PMR 400, for example, a current is caused to flow through the thin-film coil 406 so as to record data onto the recording medium.

However, the thin-film coil 406 generates heat when electric current is passed therethrough, and the heat conducts to the coil-insulating layer 407 around the thin-film coil 406. The coil-insulating layer 407 is formed of an organic material such as photoresist or the like and is thus larger in expansion coefficient than the thin-film coil 406. For this reason, when heat is applied, the coil-insulating layer 407 is likely to expand. When the coil-insulating layer 407 expands, the end part on the ABS 403 side of the write shield layer 405 is pushed to the side outer than the ABS 403 and protrudes.

The PMR is formed using the thin-film forming process on an electronic part called slider. When data is recorded on a recording medium using the PMR, the slider needs to fly from the recording medium with a slight distance intervening between them. Therefore, if a part of the ABS protrudes, the PMR is likely to bump into the recording medium.

Such protrusion of the magnetic pole layer is mainly caused by heat generation of the thin-film coil. Therefore, to suppress the protrusion of the magnetic pole layer, it is sufficient to suppress the heat generation of the thin-film coil. Generally, the heat generated from the conductor through which the electric current flows is called Joule heat and is known to be proportional to the square of the magnitude of electric current and the electric resistance of the conductor (Joule's law). Accordingly, to suppress the heat generation of the thin-film coil, it is sufficient to reduce the electric resistance of the thin-film coil.

The electric resistance of the thin-film coil is inversely proportional to the sectional area of the thin-film coil (the area of the section in the direction intersecting the direction in which the electric current flows). Therefore, to reduce the electric resistance of the thin-film coil, it is sufficient to increase the sectional area of the thin-film coil. By reducing the number of windings (also called the number of turns) wound around the magnetic pole layer of the thin-film coil, the thin-film coil is able to be made thick and the sectional area is able to be made large. However, this reduces the intensity of the magnetic field generated by the thin-film coil, causing a problem of decreasing the writing characteristics of the PMR (for example, the overwrite characteristics).

Further, the sectional area of the thin-film coil is able to be increased also by widening the width of the thin-film coil or by increasing the thickness of the thin-film coil without changing the number of turns of the thin-film coil. For example, in the case of the PMR 400, the sectional area of the thin-film coil is able to be increased even by widening the width w406 or increasing the thickness h406.

However, widening the width w406 makes it difficult to shorten the magnetic path length. The magnetic path length is the length of the magnetic pole layer around which the thin-film coil is wound, and is LX illustrated in FIG. 33 in the case of the PMR 400.

Incidentally, alternating current is passed through the thin-film coil, and the impedance during this time is proportional to the frequency and the inductance. Therefore, when alternating current having a high frequency is passed through the thin-film coil in order to increase the recording density on the magnetic recording medium, the impedance increases and thereby causes the electric current to hardly flow. To avoid this situation, it is effective to reduce the inductance and shorten the magnetic path length. However, when the width of the thin-film coil is widened, the magnetic path length needs to be increased, resulting in increased inductance of the PMR. This makes it impossible to increase the frequency of the recording signals, failing to increase the recording density on the magnetic recording medium.

On the other hand, in the PMR, there is restriction that the read/write separation (referred also to as "RWS") that is the spacing in the direction along the ABS 403 between the main magnetic pole layer 402 and the reproducing head 409 is made to fall within a range of 4.5 µm to 5 µm. Thus, when the thin-film coil is arranged between the main magnetic pole layer and the reproducing head as in the PMR disclosed in, for example, JP 2002-208111 (referred also to as Patent Document 5) or the like, RWS needs to be increased if the thickness of the thin-film coil is increased. Accordingly, given the relation with RWS, it is difficult to increase the thickness of the thin-film coil.

As described above, it has been difficult in the conventional PMR to reduce the electric resistance of the thin-film coil within the restriction range of RWS without increasing the magnetic path length.

The present invention is made to solve the above problem, and it is an object to reduce the electric resistance of a thin-film coil within the restriction range of the read/write separation without increasing the magnetic path length and suppress protrusion of a part of the ABS in a thin-film magnetic head performing magnetic recording operation in the vertical magnetic recording system and a method of manufacturing the same and a head gimbal assembly and a hard disk drive.

To solve the above problem, the present invention is a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film coil has a coil-layer having a turn part arranged at a position closer to the medium-opposing surface than is a rear end part of the main magnetic pole layer farthest from the medium-opposing surface, and supposing that the thickness of the coil-layer in a direction along the medium-opposing surface is a coil thickness and a part of the coil-layer corresponding to an arrangement space where the main magnetic pole layer is arranged is a magnetic pole corresponding part, the thin-film coil is formed such that, at least in a substrate side coil-layer arranged between the main magnetic pole layer and the substrate in the coil-layer, the coil thickness of a non-corresponding magnetic pole part that is a part other than the magnetic pole corresponding part is larger than the coil thickness of the magnetic pole corresponding part.

In the case of this thin-film magnetic head, in the substrate side coil-layer, since the coil thickness of the magnetic pole corresponding part is smaller than the coil thickness of the non-corresponding magnetic pole part, the main magnetic pole layer is arranged at a position accordingly closer to the substrate.

Further, the present invention provides a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film coil has a first coil-layer and a second coil-layer respectively having a first turn part and a second turn part arranged at positions closer to the medium-opposing surface than is a rear end part of the main magnetic pole layer farthest from the medium-opposing surface, and supposing that the thicknesses of the first coil-layer and the second coil-layer in a direction along the medium-opposing surface are a first coil thickness and a second coil thickness respectively and parts of the first coil-layer and the second coil-layer corresponding to arrangement spaces where the main magnetic pole layer is arranged are a first magnetic pole corresponding part and a second magnetic pole corresponding part respectively, the thin-film coil is formed such that, at least in a first substrate side coil-layer and a second substrate side coil-layer arranged between the main magnetic pole layer and the substrate in the first coil-layer and the second coil-layer, the first coil thickness and the second coil thickness of a first non-corresponding magnetic pole part and a second non-corresponding magnetic pole part that are parts other than the first magnetic pole corresponding part and the second magnetic pole corresponding part are larger than the first coil thickness and the second coil thickness of the first magnetic pole corresponding part and the second magnetic pole corresponding part.

Also in the case of this thin-film magnetic head, in the substrate side coil-layers, since the coil thicknesses of the first and second magnetic pole corresponding parts are smaller than the coil thicknesses of the first and second non-corresponding magnetic pole parts, the main magnetic pole layer is arranged at a position accordingly closer to the substrate.

In the case of the above-described thin-film magnetic head, it is preferable that the thin-film coil has a story structure in which the first coil-layer and the second coil-layer overlie in the vertical direction along the medium-opposing surface, and the first magnetic pole corresponding part and the second magnetic pole corresponding part overlie in the vertical direction along the medium-opposing surface.

In the case of this thin-film magnetic head, since the thin-film coil has the story structure, the first coil-layer and the second coil-layer are arranged in the vertical direction along the medium-opposing surface. In addition, since the first magnetic pole corresponding part and the second magnetic pole corresponding part overlie in the vertical direction, the main magnetic pole layer is arranged at a position close to the substrate.

Further, in the case of the above-described thin-film magnetic head, it is preferable that the thin-film coil has a partially recessed structure in which upper surfaces of the first magnetic pole corresponding part and the second magnetic pole corresponding part are recessed with respect to upper surfaces of the first non-corresponding magnetic pole part and the second non-corresponding magnetic pole part, and has a combined recessed parts structure in which the second magnetic pole corresponding part fits in a first recessed part formed in the first magnetic pole corresponding part.

In the case of this thin-film magnetic head, since the thin-film coil has the combined recessed parts structure in which the second magnetic pole corresponding part fits in the first recessed part, the main magnetic pole layer is arranged at a position close to the substrate.

Further, in the case of the above-described thin-film magnetic head, it is preferable that the thin-film coil has, as the turn part, a front turn part arranged at a position closest to the medium-opposing surface and a rear turn part arranged at a position farther from the medium-opposing surface than is the front turn part, and is formed such that, in each of the front turn part and the rear turn part, the coil thickness of the non-corresponding magnetic pole part is larger than the coil thickness of the magnetic pole corresponding part.

Further, it is preferable that the thin-film coil has, as the first turn part, a first front turn part arranged at a position closest to the medium-opposing surface and a first rear turn part arranged at a position farther from the medium-opposing surface than is the first front turn part and, as the second turn part, a second front turn part arranged at a position closest to the medium-opposing surface and a second rear turn part arranged at a position farther from the medium-opposing surface than is the second front turn part, and is formed such that, in each of the first front turn part and the first rear turn part, the first coil thickness of the first non-corresponding magnetic pole part is larger than the first coil thickness of the first magnetic pole corresponding part and, in each of the second front turn part and the second rear turn part, the second coil thickness of the second non-corresponding magnetic pole part is larger than the second coil thickness of the second magnetic pole corresponding part.

Further, it is preferable that the thin-film coil has an upper conductor group and a lower conductor group arranged at positions equidistant from the medium-opposing surface and opposing each other through the main magnetic pole layer, and the upper conductor group and the lower conductor group have the first coil-layer and the second coil-layer respectively.

Further, it is preferable that a bottom surface arranged on the substrate side of the main magnetic pole layer is arranged at a position closer to the substrate than is an upper surface on the side farther from the substrate of the substrate side coil-layer.

Further, it is possible that a bottom surface arranged on the substrate side of the main magnetic pole layer is arranged at a position closer to the substrate than are uppermost surfaces on the side farthest from the substrate of the first substrate side coil-layer and the second substrate side coil-layer.

It is preferable that the above-described thin-film magnetic head has a bottom insulating layer in contact with an upper surface of the magnetic pole corresponding part, the main magnetic pole layer is formed on the upper surface of the bottom insulating layer.

Further, it is preferable that the above-described thin-film magnetic head has a bottom insulating layer in contact with uppermost surfaces on the side farthest from the substrate of the first magnetic pole corresponding part and the second magnetic pole corresponding part, the main magnetic pole layer is formed on the upper surface of the bottom insulating layer.

In the case of the above-described thin-film magnetic head, it is preferable that the thin-film coil further has a third coil-layer having a third turn part arranged at a position closer to the medium-opposing surface than is the rear end part of the main magnetic pole layer, and supposing that the thickness of the third coil-layer in a direction along the medium-opposing surface is a third coil thickness and a part of the third coil-layer corresponding to the arrangement space is a third magnetic pole corresponding part, the thin-film coil is formed such that, at least in a third substrate side coil-layer arranged between the main magnetic pole layer and the substrate in the third coil-layer, the third coil thickness of a third non-corresponding magnetic pole part that is a part other than the third magnetic pole corresponding part is larger than the third coil thickness of the third magnetic pole corresponding part.

Further, the present invention provides a method of manufacturing a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following steps (1) to (4):

(1) a conductor layer forming step of forming a conductor layer constituting the thin-film coil, on a surface of a multi-layer body;

(2) a coil thickness changing step of changing the thickness of the conductor layer formed in the conductor layer forming step such that a non-corresponding part other than a corresponding part corresponding to an arrangement space where the main magnetic pole layer is arranged is thicker than the corresponding part;

(3) a bottom insulating layer forming step of forming a bottom insulating layer in contact with a surface of the corresponding part after carrying out the coil thickness changing step;

(4) a main magnetic pole layer forming step of forming the main magnetic pole layer on the bottom insulating layer.

In the case of the above-described method of manufacturing, it is possible that the coil thickness changing step is carried out by performing etching on the corresponding part to form a recessed part in the surface of the corresponding part.

Further, the present invention provides a method of manufacturing a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following steps (1) to (7):

(1) a first conductor layer forming step of forming a first conductor layer constituting the thin-film coil, on a surface of a multilayer body;

(2) a first coil thickness changing step of changing the thickness of the first conductor layer formed in the first conductor layer forming step such that a non-first corresponding part other than a first corresponding part corresponding to an arrangement space where the main magnetic pole layer is arranged is thicker than the first corresponding part;

(3) a coil-interlayer insulating layer forming step of forming a coil-interlayer insulating layer in contact with a surface of the first conductor layer after carrying out the first coil thickness changing step;

(4) a second conductor layer forming step of forming a second conductor layer constituting the thin-film coil, on a surface of the coil-interlayer insulating layer;

(5) a second coil thickness changing step of changing the thickness of the second conductor layer formed in the second conductor layer forming step such that a non-second corresponding part other than a second corresponding part corresponding to the arrangement space is thicker than the second corresponding part;

(6) a bottom insulating layer forming step of forming a bottom insulating layer in contact with a surface of the second corresponding part after carrying out the second coil thickness changing step; and (7) a main magnetic pole layer forming step of forming the main magnetic pole layer on the bottom insulating layer.

In the case of the above-described method of manufacturing, it is possible that the first coil thickness changing step and the second coil thickness changing step are carried out by performing etching on the first corresponding part and the second corresponding part to form a first recessed part and a second recessed part in the surface of the first corresponding part and the surface of the second corresponding part respectively.

Further, it is possible that the second conductor layer forming step is carried out in a manner that the first conductor layer and the second conductor layer overlie in the vertical direction along the medium-opposing surface, and the second coil thickness changing step is carried out in a manner that the first recessed part and the second recessed part overlie in the vertical direction.

Further, it is preferable that the method of manufacturing further has the following steps (8) to (9):

(8) a shield magnetic layer forming step of forming the shield magnetic layer;

(9) a shield thickness changing step of changing the thickness of a front shield layer arranged closer to the medium-opposing surface than is the thin-film coil in the shied magnetic layer formed in the shield magnetic forming step such that a non-corresponding shield layer other than a corresponding shield layer corresponding to the arrangement space is thicker than the corresponding shield layer.

Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film coil has a coil-layer having a turn part arranged at a position closer to the medium-opposing surface than is a rear end part of the main magnetic pole layer farthest from the medium-opposing surface, and supposing that the thickness of the coil-layer in a direction along the medium-opposing surface is a coil thickness and a part of the coil-layer corresponding to an arrangement space where the main magnetic pole layer is arranged is a magnetic pole corresponding part, the thin-film coil is formed such that, at least in a substrate side coil-layer arranged between the main magnetic pole layer and the substrate in the coil-layer, the coil thickness of a non-corresponding magnetic pole part that is a part other than the magnetic pole corresponding part is larger than the coil thickness of the magnetic pole corresponding part.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film coil has a coil-layer having a turn part arranged at a position closer to the medium-opposing surface than is a rear end part of the main magnetic pole layer farthest from the medium-opposing surface, and supposing that the thickness of the coil-layer in a direction along the medium-opposing surface is a coil thickness and a part of the coil-layer corresponding to an arrangement space where the main magnetic pole layer is arranged is a magnetic pole corresponding part, the thin-film coil is formed such that, at least in a substrate side coil-layer arranged between the main magnetic pole layer and the substrate in the coil-layer, the coil thickness of a non-corresponding magnetic pole part that is a part other than the magnetic pole corresponding part is larger than the coil thickness of the magnetic pole corresponding part.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

Figure 19:
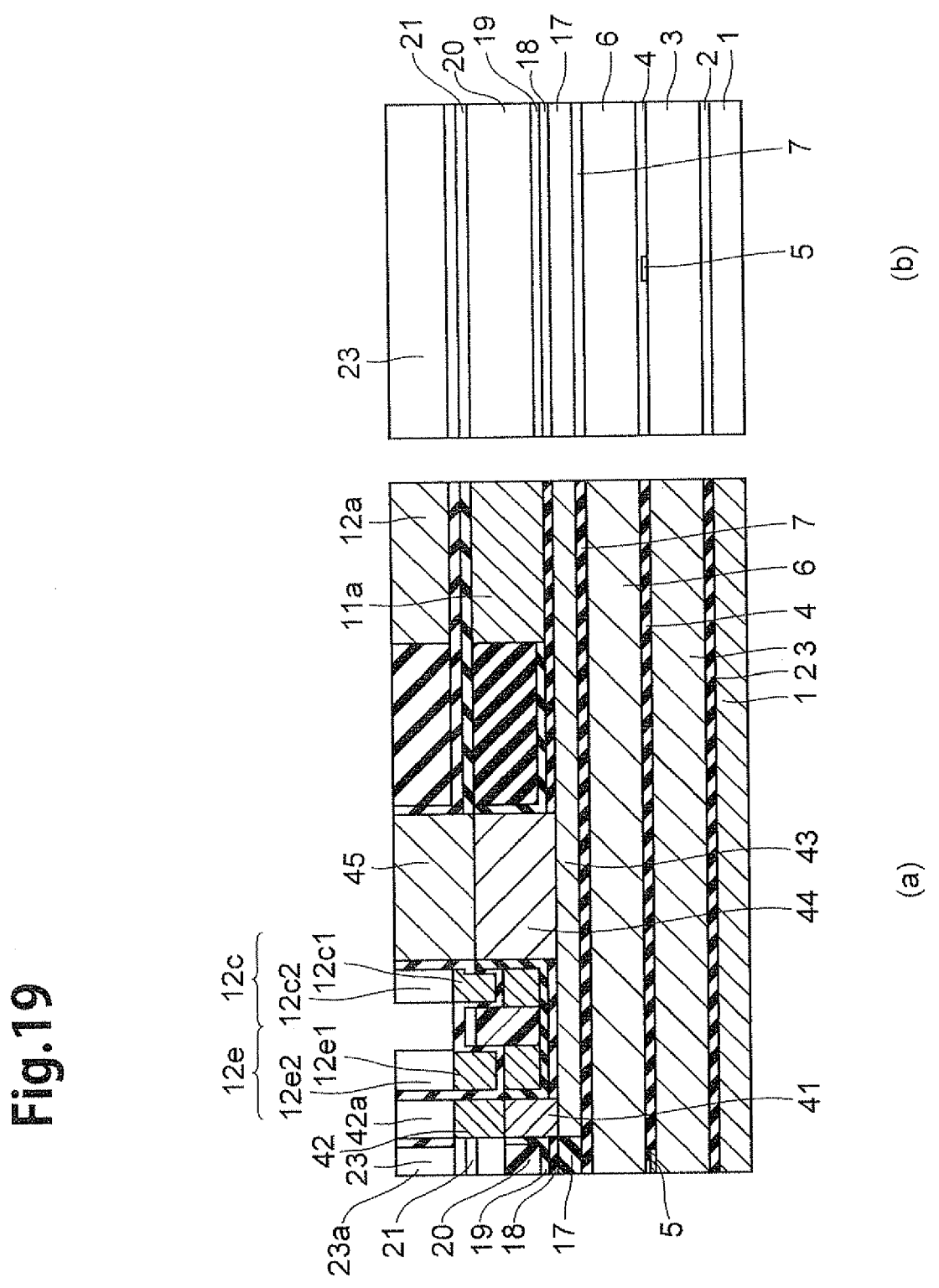

FIG. 19 illustrates a step subsequent to that of FIG. 18, in which (a) is a sectional view corresponding to FIG. 1, in which (b) is a front view corresponding to FIG. 2;

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment (Structures of Thin-Film Magnetic Head)

Figure 1:
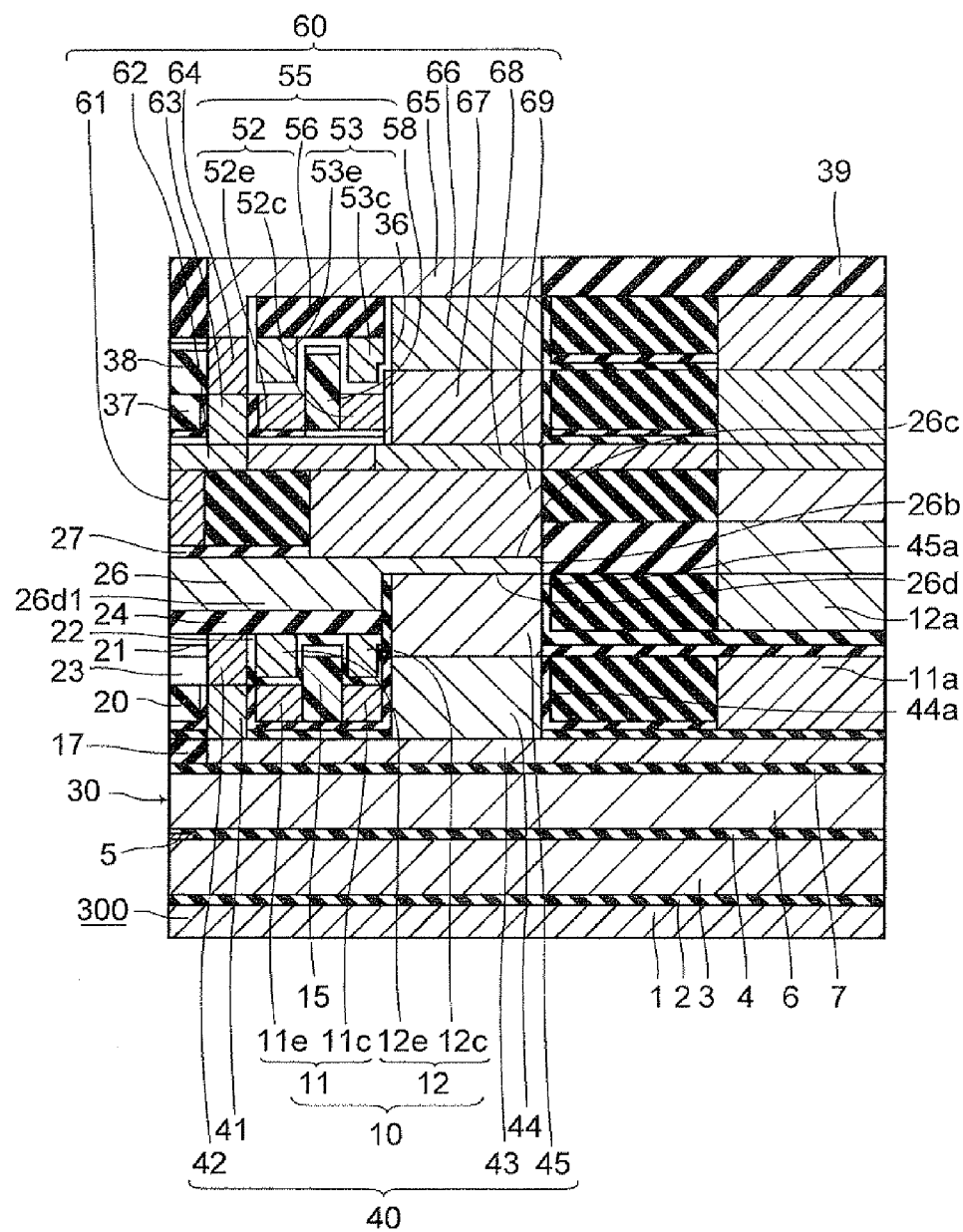
FIG. 1 is a sectional view of the thin-film magnetic head according to a first embodiment of the present invention taken along the line 1-1 of FIG. 2, along by a direction intersecting its air bearing surface.
Figure 2:
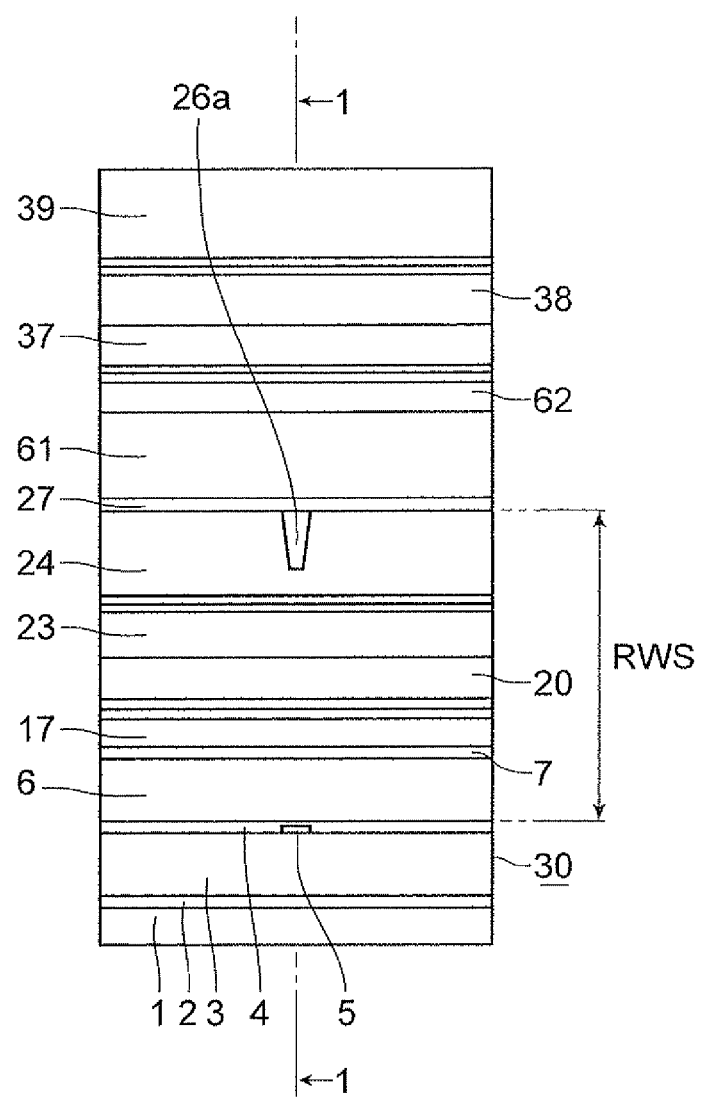
FIG. 2 is a front view illustrating an ABS of the thin-film magnetic head.
Figure 3:
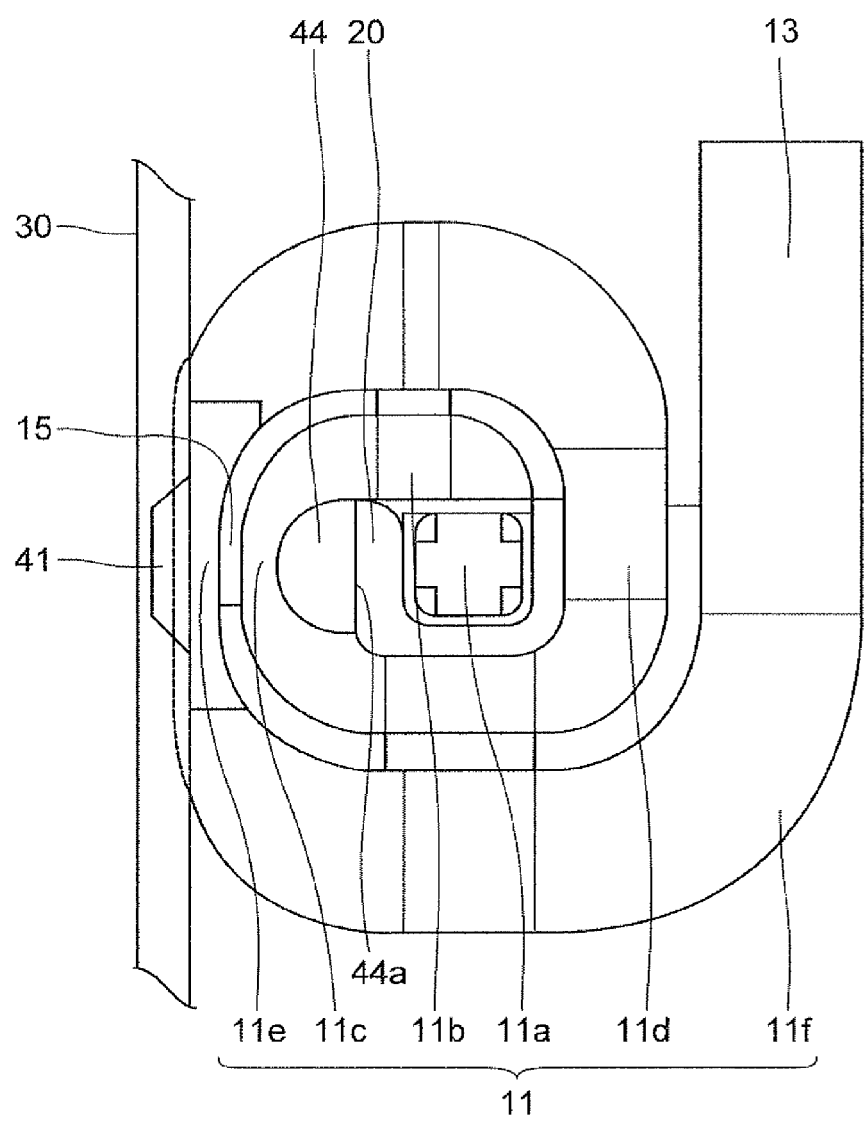
FIG. 3 is a plan view illustrating a first coil-layer.
Figure 4:
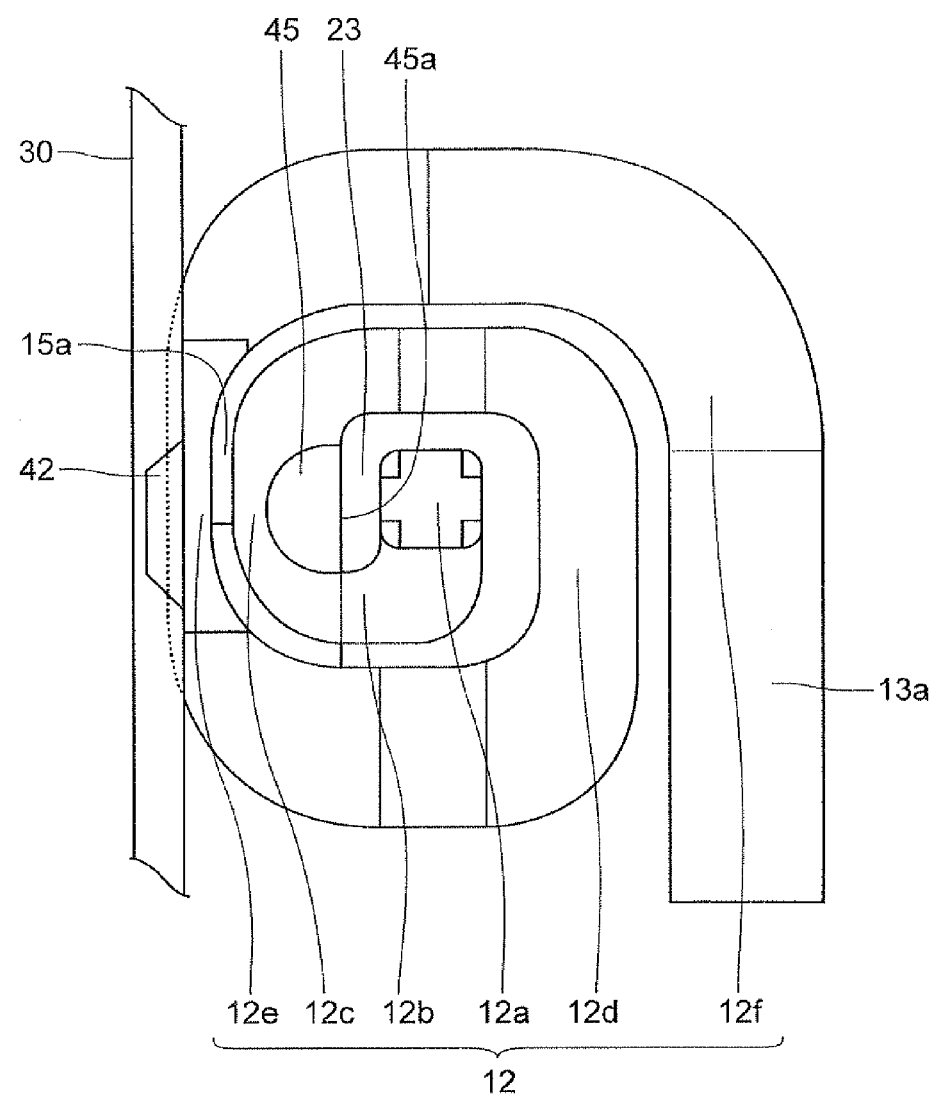
FIG. 4 is a plan view illustrating a second coil-layer.
Figure 5:
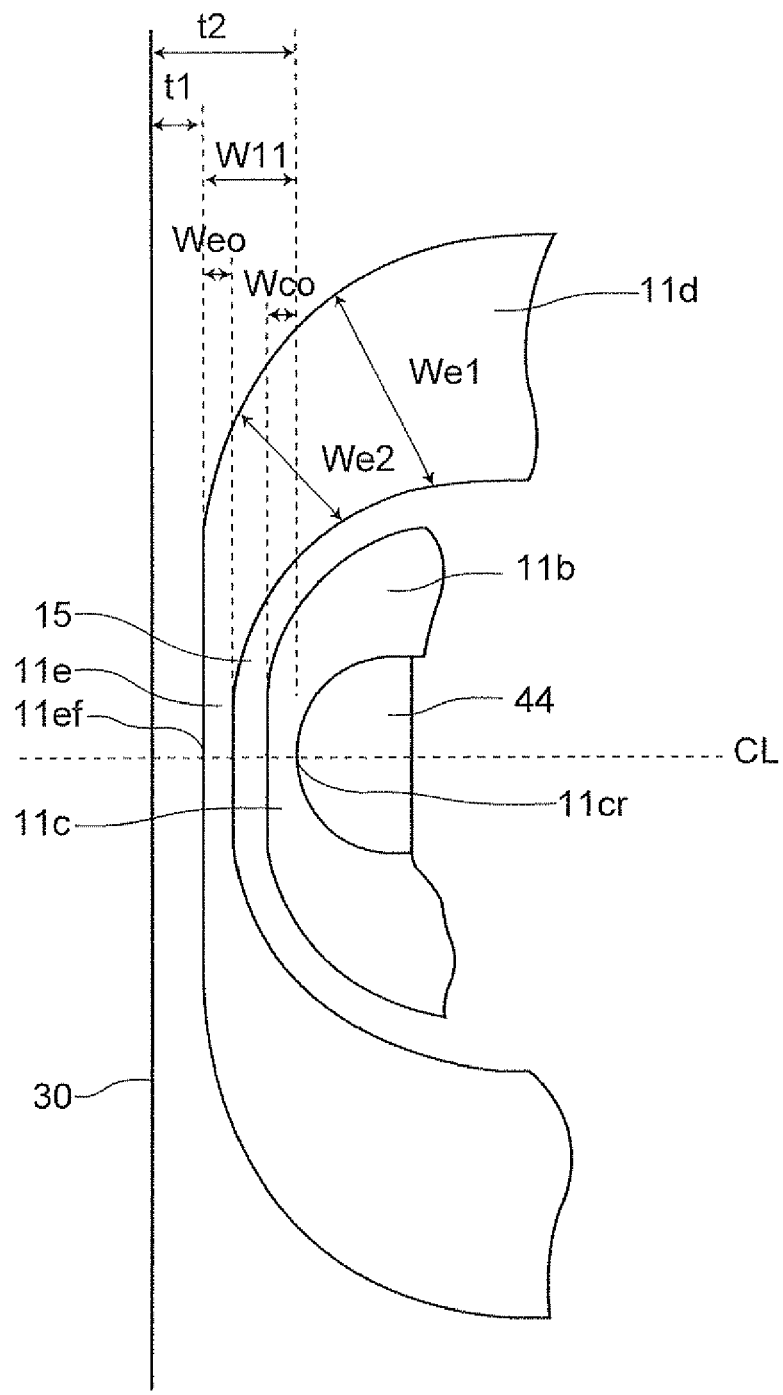
FIG. 5 is a plan view illustrating a principal part of the first coil-layer.
Figure 6:
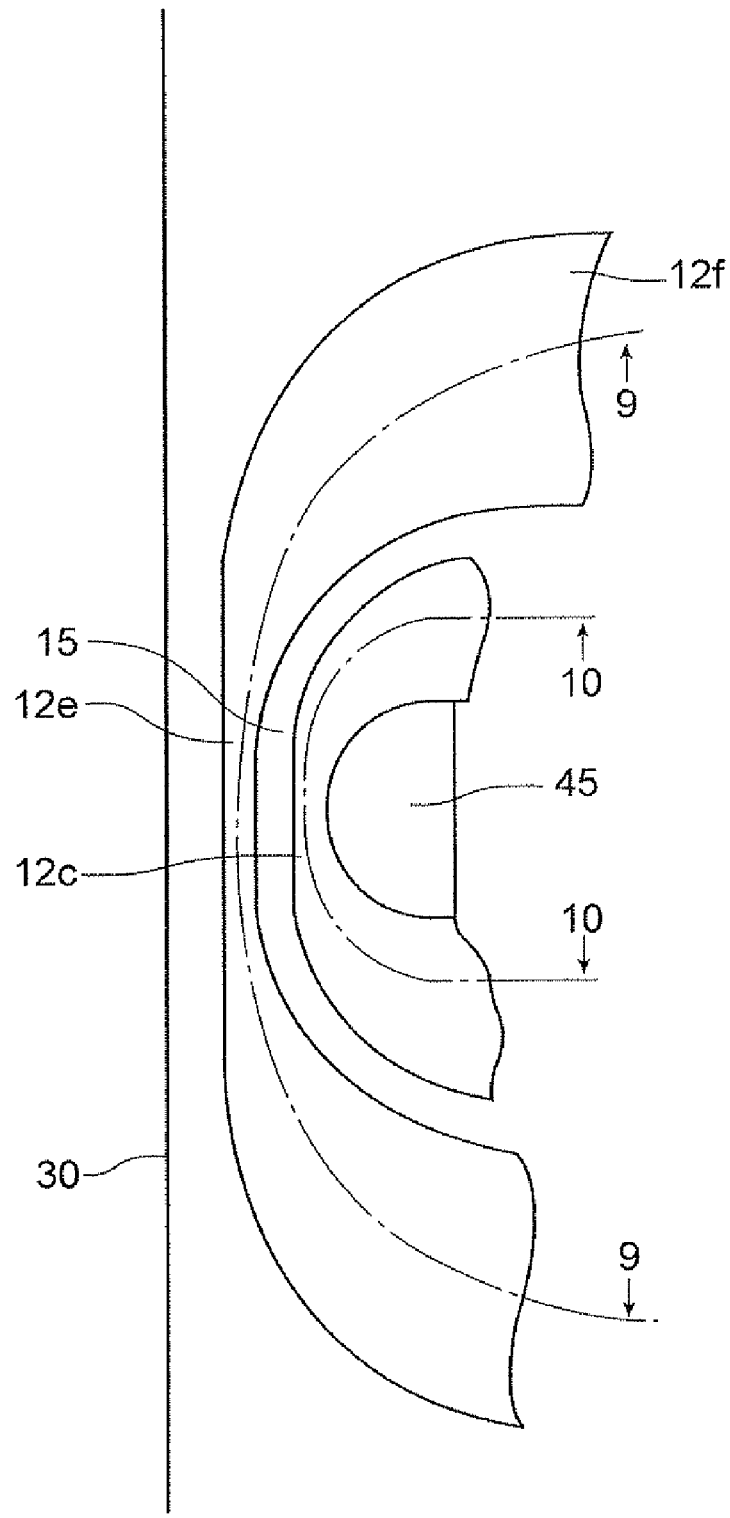
FIG. 6 is a plan view illustrating a principal part of the second coil-layer laid on the first coil-layer.
Figure 7:
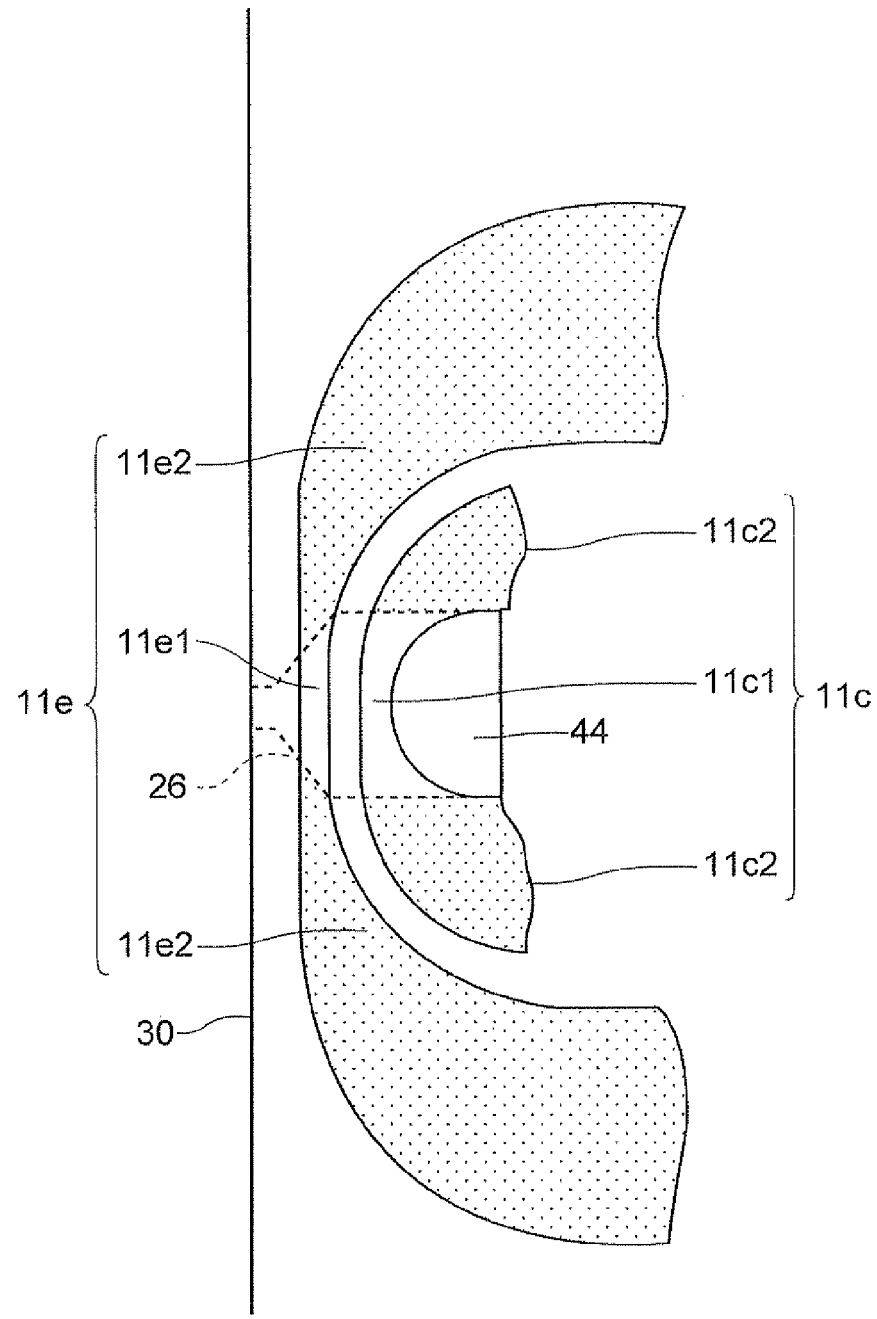
FIG. 7 is a plan view illustrating the first coil-layer with a difference of its thickness.
Figure 8:
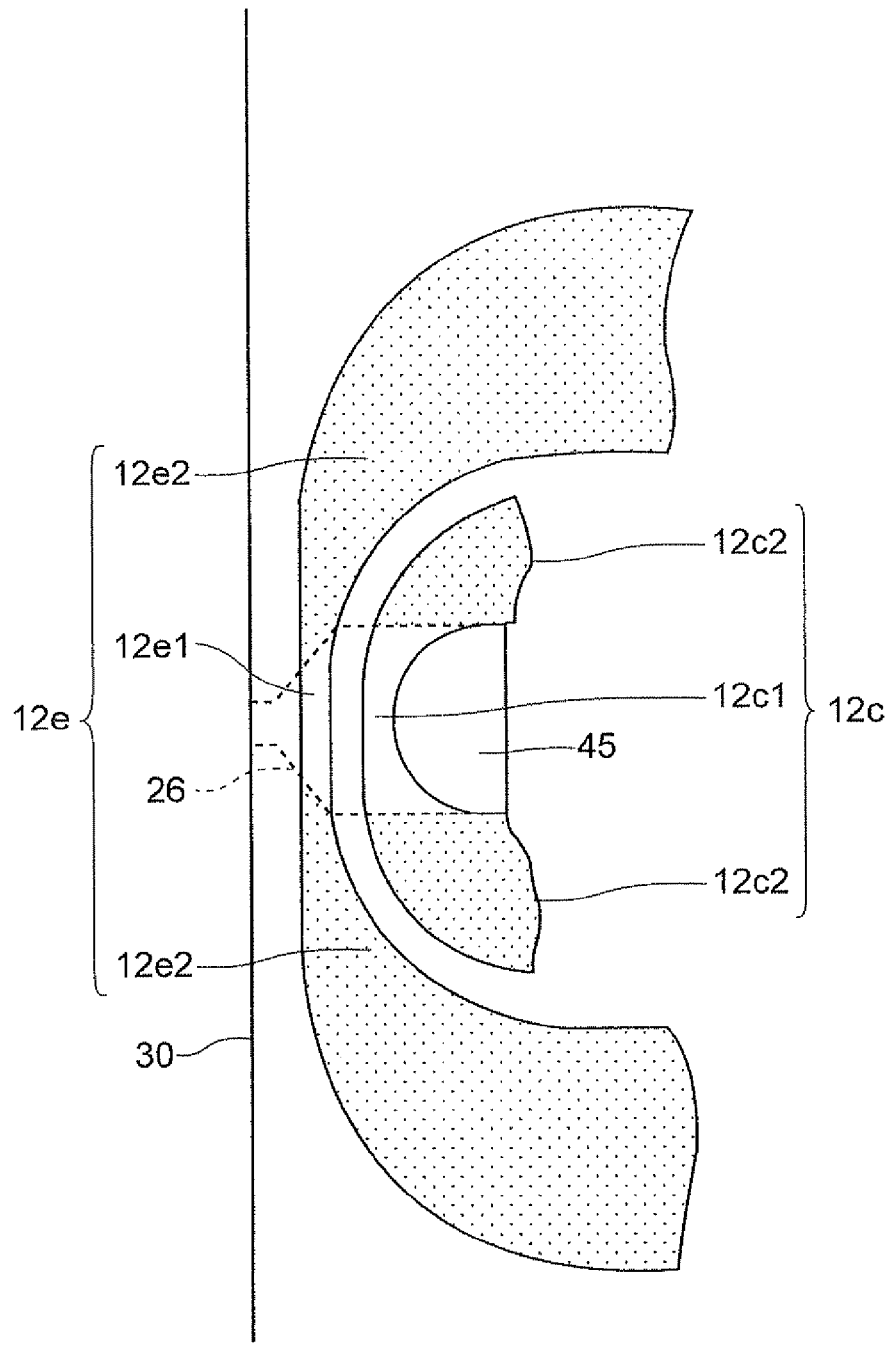
FIG. 8 is a plan view illustrating the second coil-layer with a difference of its thickness.
Figure 9:
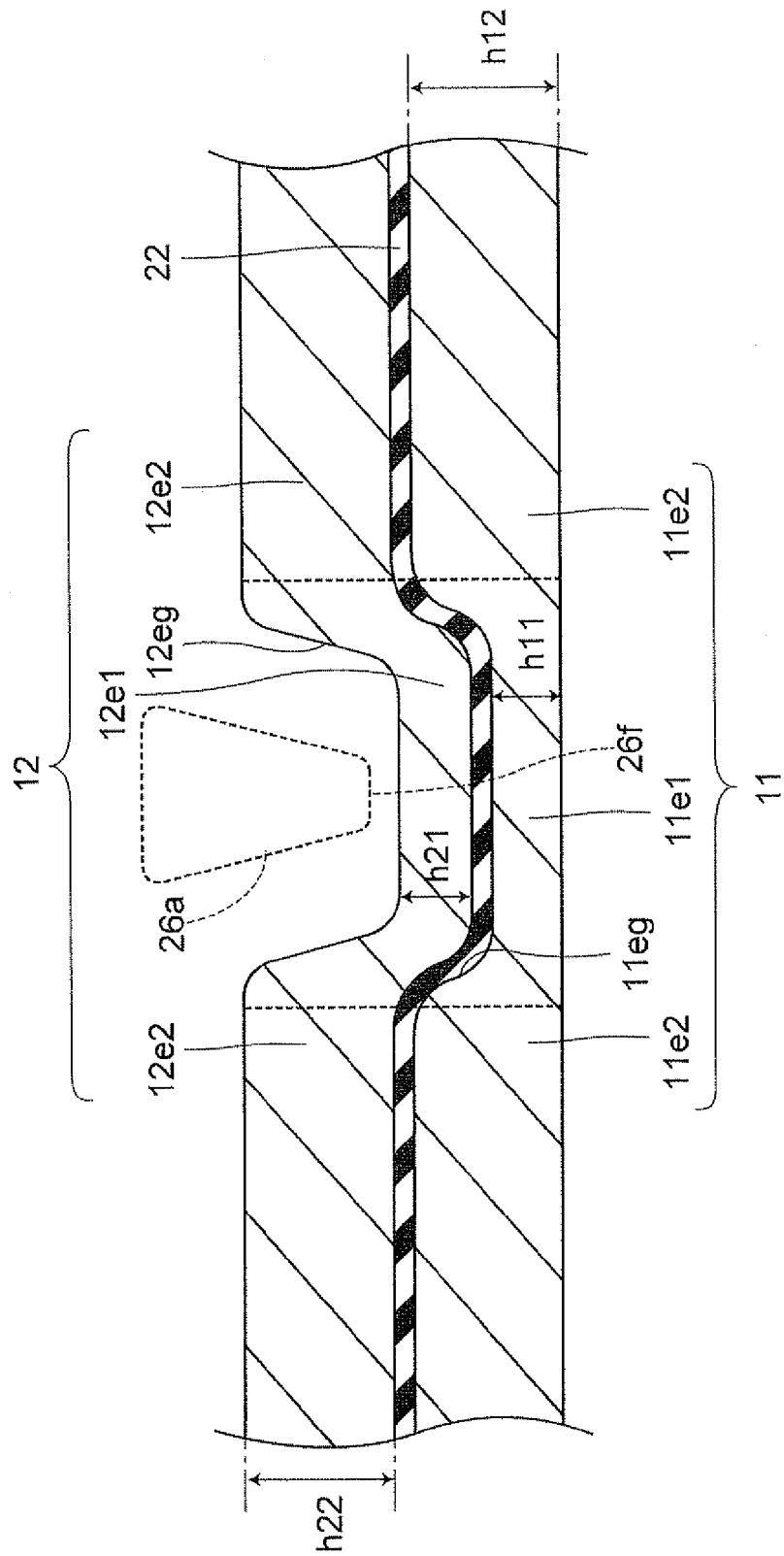
FIG. 9 is a sectional view taken along the line 9-9 in FIG. 6.
Figure 10:
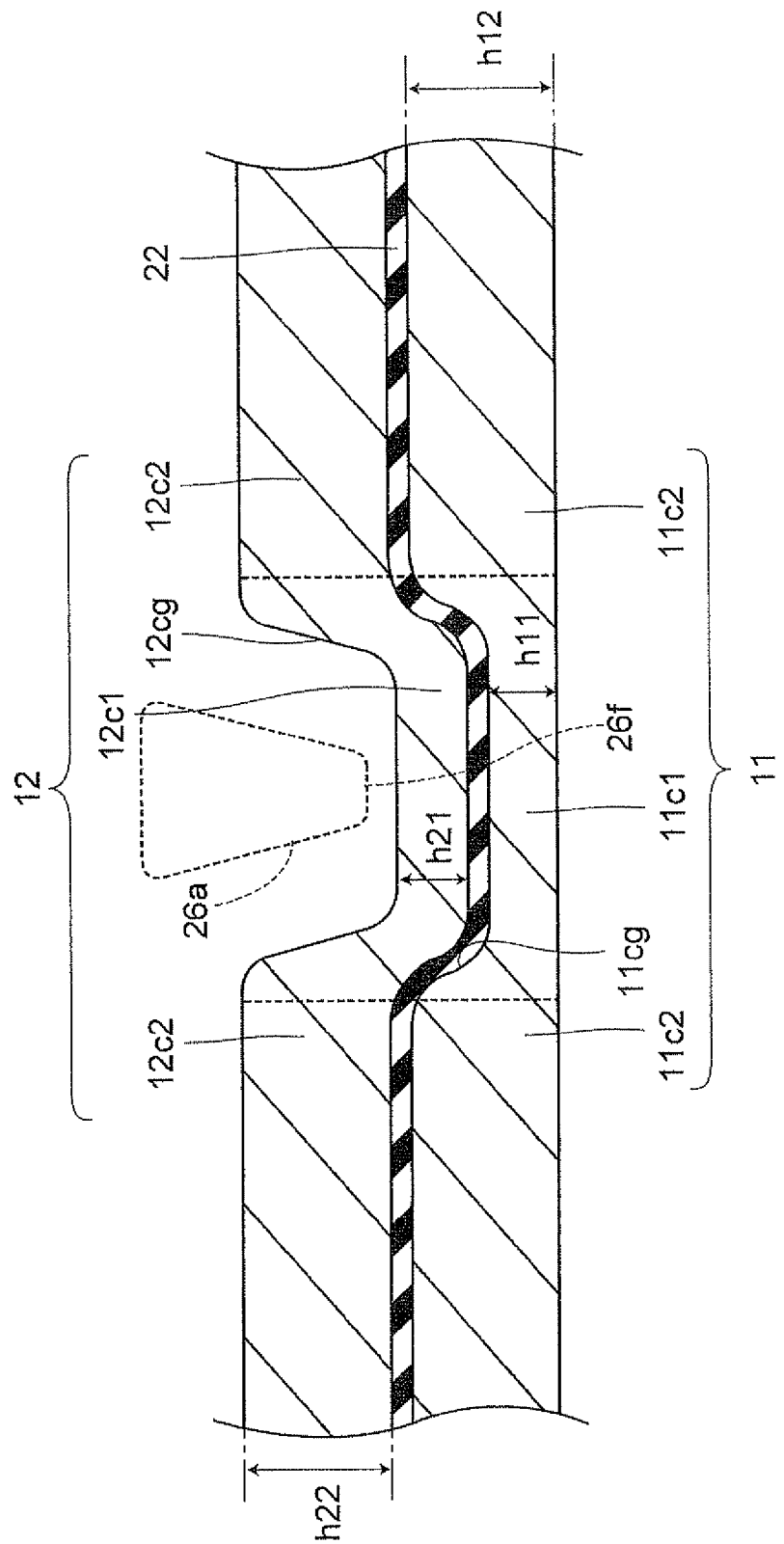
FIG. 10 is a sectional view taken along the line 10-10 in FIG. 6.
Figure 11:
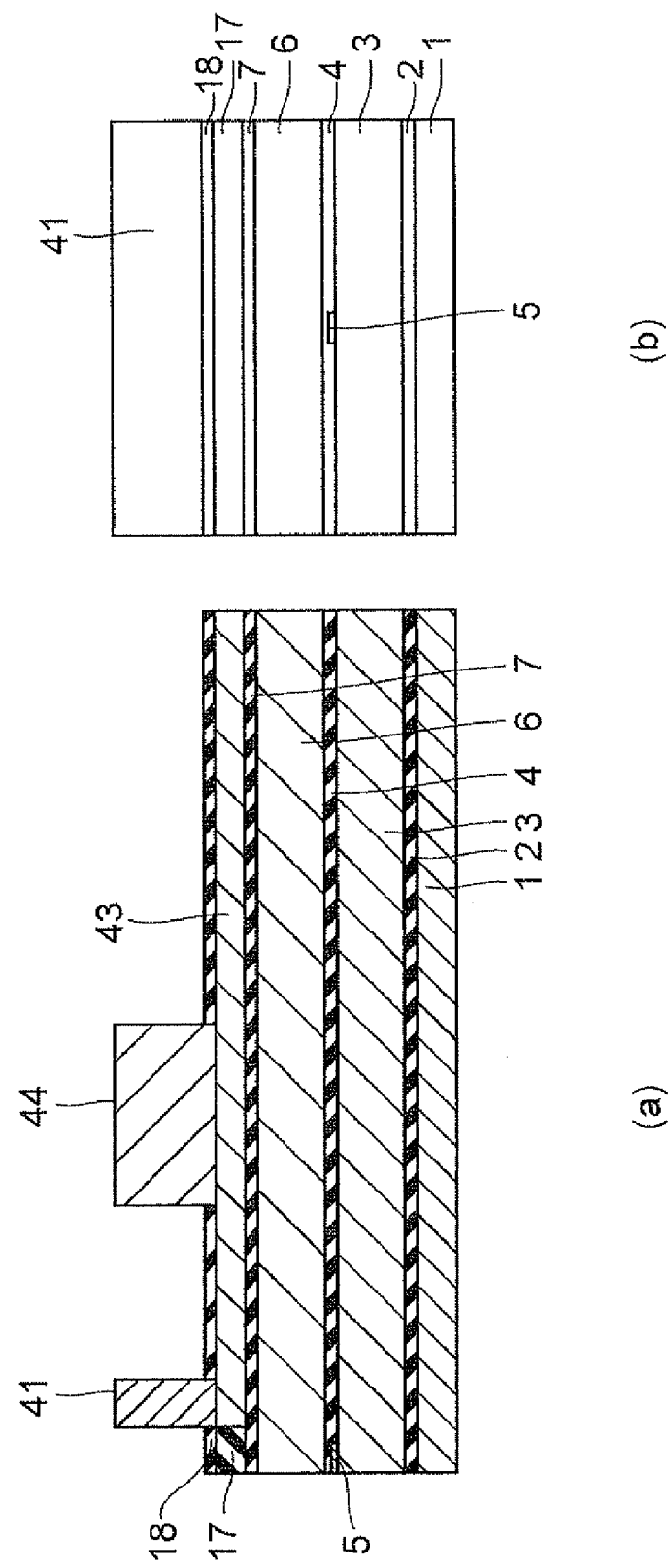
FIG. 11 illustrates a step of manufacturing the thin-film magnetic head illustrated in FIG. 1, in which (a) is a sectional view corresponding to FIG. 1, in which (b) is a front view corresponding to FIG. 2.
Figure 12:
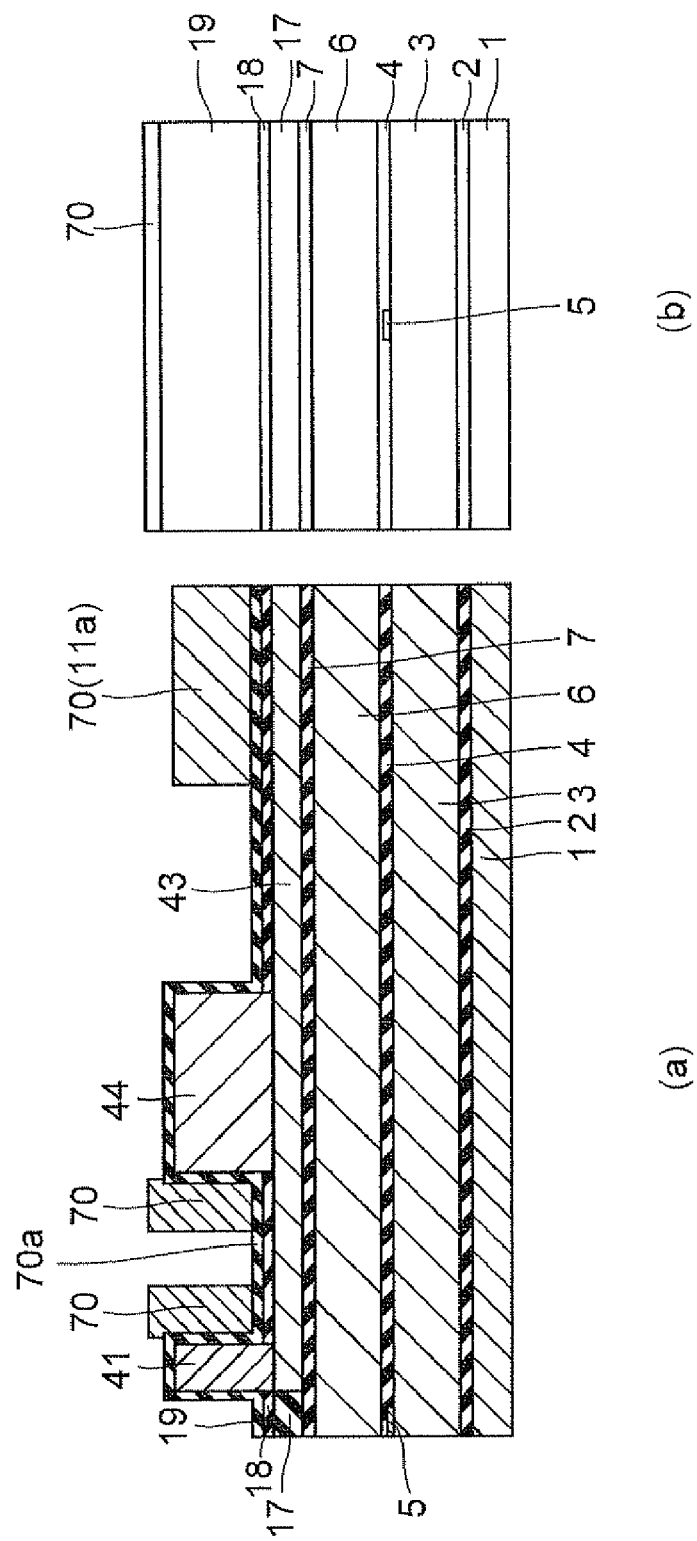
FIG. 12 illustrates a step subsequent to that of FIG. 11 in which (a) is a sectional view corresponding to FIG. 1, in which (b) is a front view corresponding to FIG. 2.
Figure 13:
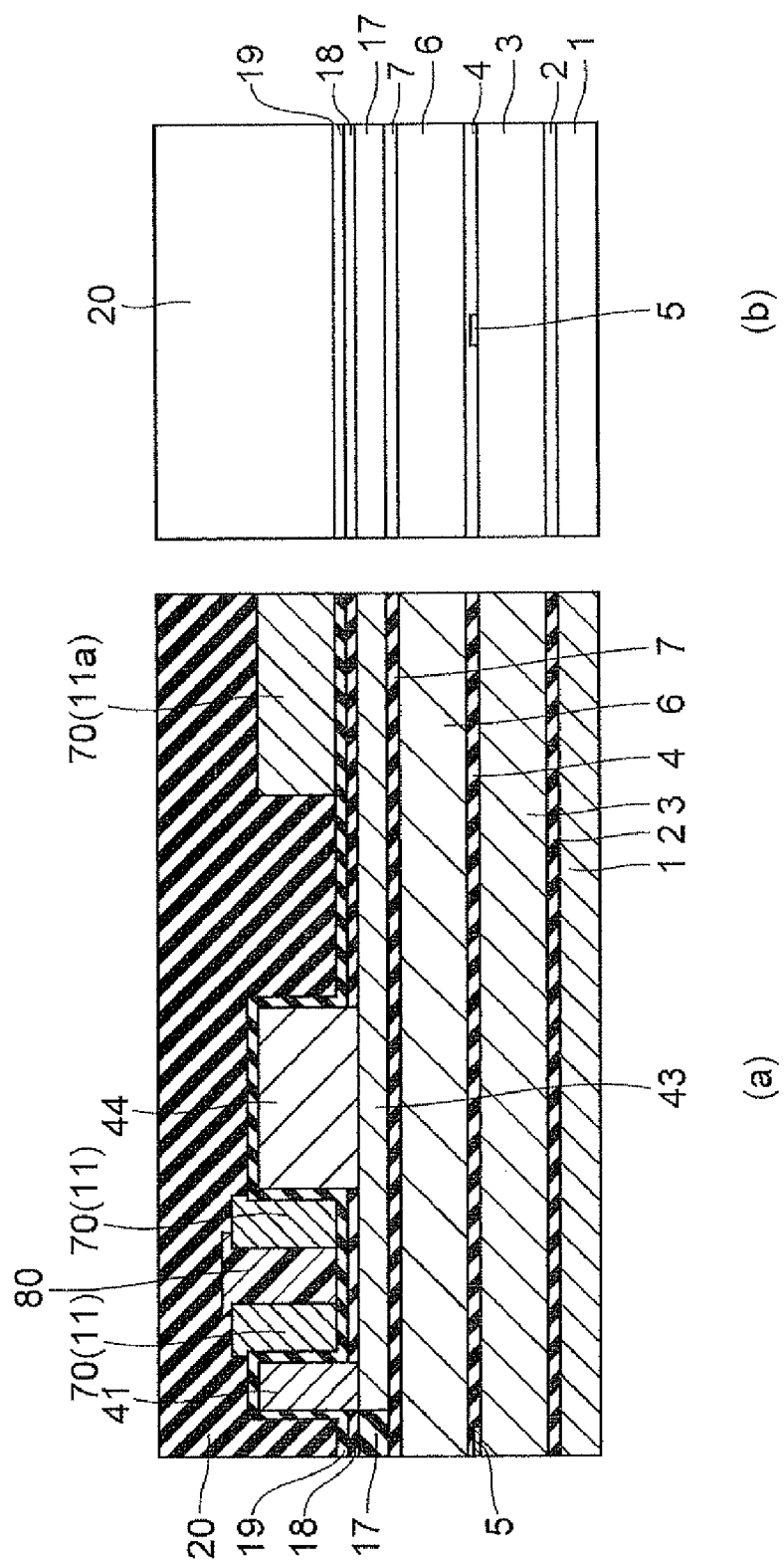
FIG. 13 illustrates a step subsequent to that of FIG. 12, in which (a) is a sectional view corresponding to FIG. 1, in which (b) is a front view corresponding to FIG. 2.

To begin with, the structure of a thin-film magnetic head of perpendicular magnetic recording type according to the first embodiment of the present invention will be explained with reference to FIG. 1 to FIG. 10. Here, FIG. 1 is a sectional view of the thin-film magnetic head 300 according to a first embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300. FIG. 3 is a plan view illustrating a first coil-layer 11. FIG. 4 is a plan view illustrating a second coil-layer 12. FIG. 5 is a plan view illustrating a principal part of the first coil-layer 11. FIG. 6 is a plan view illustrating a principal part of the second coil-layer 12 laid on the first coil-layer 11. FIG. 7 is a plan view illustrating the first coil-layer 11 with a difference of its thickness. FIG. 8 is a plan view illustrating the second coil-layer 12 with a difference of its thickness. FIG. 9 is a sectional view taken along the line 9-9 in FIG. 6. FIG. 10 is a sectional view taken along the line 10-10 in FIG. 6.

The thin-film magnetic head 300 comprises a substrate 1 and reproducing and recording heads laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head has a lower thin-film coil 10, a bottom insulating layer 24, a main magnetic pole layer 26, a gap layer 27, a shield magnetic layer 40, an upper thin-film coil 55, and an write shield layer 60, which are laminated on the substrate 1.

Further, the recording head also has a first lower opposing insulating layer 20 arranged at an ABS 30 side (at a position closer to the ABS 30) than is the lower thin-film coil 10, a second lower opposing insulating layer 23. The recording head also has a first upper opposing insulating layer 37 arranged at the ABS 30 side than the upper thin-film coil 55, a second upper opposing insulating layer 38.

The lower thin-film coil 10 has the first coil-layer 11 and second coil-layer 12 arranged at positions separated from the ABS 30, while a lower conductor group is constituted by the first coil-layer 11 and the second coil-layer 12. The lower thin-film coil 10 corresponds to a part arranged between the main magnetic pole layer 26 and the substrate 1 in the thin-film coil formed in the thin-film magnetic head 300. Therefore, the lower thin-film coil 10 corresponds to a substrate side coil-layer according to the embodiment of the present invention.

The first coil-layer 11 and the second coil-layer 12 are arranged parallel to each other in a direction along the ABS 30 (which will be referred to as "vertical direction" in this embodiment). The second coil-layer 12 overlies the first coil-layer 11 while interposing a coil-interlayer insulating layer 22 therebetween. The lower thin-film coil 10 has an overlapping structure by two layers. Further, the lower thin-film coil 10 has an equidistant two-stage structure in which the first and second coil-layers 11, 12 have the same front distance and the same rear distance.

Here, the front distance of the first coil-layer 11 is the distance (distance t1 illustrated in FIG. 5) from a front side face 11ef (see FIG. 5) of a later-described turn part lie closer to the ABS 30 to the ABS 30. The front distance of the second coil-layer 12 is the distance from a front side face (front side face similar with the front side face 11ef) of a later-described turn part 12e closer to the ABS 30 to the ABS 30.

The rear distance of the first coil-layer 11 is the distance (distance t2 illustrated in FIG. 5) from a rear side face 11cr (see FIG. 5) of a later-described turn part 11c farther from the ABS 30 to the ABS 30. The rear distance of the second coil-layer 12 is the distance from a rear side face (rear side face similar with the rear side face 11cr) of a later-described turn part 12c farther from the ABS 30 to the ABS 30.

The first coil-layer 11 has two turn parts 11c, 11e arranged between a later-described first front shield layer 41 and a first rear shield layer 44. The first coil-layer 11 has a structure which the turn parts 11c, 11e align with each other while interposing a photoresist layer 15 therebetween. The turn parts 11c, 11e correspond to a first turn part according to the embodiment of the present invention. Since the turn part 11e is arranged at a closest position to the ABS 30 of the turn parts 11c, 11e, the turn part 11e corresponds to a first front turn part, the turn part 11c corresponds to a first rear turn part.

As illustrated in FIG. 3, the first coil-layer 11 has a half-loop part 11b extending from a connecting part 11a connected to the second coil-layer 12 to the turn part 11c, a one-loop part 11d extending from the turn part 11c to the turn part 11e, and a half-loop part 11f extending from the turn part lie to a lead part 13.

The first coil-layer 11 is constructed as a continuous line from the connecting part 11a to the half-loop part 11f, so as to be wound as a flat spiral about the shield magnetic layer 40, thus forming a two-turn loop as a whole. For convenience of illustration, FIG. 1 illustrates only the connecting part 11a and turn parts 11c, 11e in the first coil-layer 11. FIG. 5 and FIG. 6 do not depict the insulating layers. Each of the turn parts 11c, 11e has a vertically long structure in which the thickness (height in a direction along with the ABS 30) greater than the horizontal width (width in a direction intersecting the ABS 30).

In the first coil-layer 11, as illustrated in FIG. 5, the one-loop part 11d has a variable width structure in which the width gradually decreases toward the ABS 30 and becomes the smallest at the position closest to the ABS 30. Namely, when widths We1, We2, We0 are defined in the one-loop part 11d as illustrated in FIG. 5, We1>We2>We0. The narrowest part in the one-loop part 11d is the turn part 11e. The half-loop part 11b has a variable width structure similar to that of the one-loop part 11d, while the narrowest part is the turn part 11c. Here, the respective widths of the turn parts 11e, 11c are We0 (about 0.9 μm) and We0 (about 0.9 μm). The half-loop part 11f also has a variable width structure similar to that of the one-loop part 11d.

Meanwhile, as illustrated in FIG. 1, supposing that a part of the main magnetic pole layer 26 farthest from the ABS 30 is a rear end part 26b, both of the turn part 11e and the turn part 11c are arranged at positions closer to the ABS 30 than is the rear end part 26b. The interval between this rear end part 26b and the ABS 30 is equal to the interval between a rear end part 44a and the ABS 30. Therefore, as illustrated in FIG. 3, the turn part 11e and the turn part 11c are arranged at positions closer to the ABS 30 than is the rear end part 44a. Note that the rear end part 44a is a part of the first rear shield layer 44 farthest from the ABS 30.

Further, as illustrated in FIG. 9, FIG. 10, the first coil-layer 11 is formed such that first non-corresponding magnetic pole parts 11e2, 11c2 are larger in coil thickness than first magnetic pole corresponding parts 11e1, 11c1.

The first magnetic pole corresponding parts 11e1, 11c1 mean parts of the first coil-layer 11 corresponding to arrangement spaces where the main magnetic pole layer 26 is arranged, namely, parts of the first coil-layer 11 corresponding to occupying spaces that the main magnetic pole layer 26 occupies. The first non-corresponding magnetic pole parts 11e2, 11c2 mean parts of the first coil-layer 11 other than the first magnetic pole corresponding parts 11e1, 11c1. In FIG. 7, parts without dots represent the first magnetic pole corresponding parts 11e1, 11c1, and parts with dots represent the first non-corresponding magnetic pole parts 11e2, 11c2.

Here, the coil thickness means the thickness of the lower thin-film coil 10 in a direction along the ABS 30. The coil thickness of the first coil-layer 11 corresponds to a first coil thickness. As illustrated in FIG. 9, FIG. 10, the first coil thicknesses of both of the first magnetic pole corresponding parts 11e1, 11c1 are h11 and the first coil thicknesses of both of the first non-corresponding magnetic pole parts 11e2, 11c2 are h12, and h11<h12 because h12 is larger than h11. Further, the first coil-layer 11 is formed such that the upper surfaces (surfaces on the side farther from the substrate 1) of the first magnetic pole corresponding parts 11e1, 11c1 are recessed with respect to the upper surfaces of the first non-corresponding magnetic pole parts 11e2, 11c2 so that recessed parts 11eg, 11cg are formed in the first magnetic pole corresponding parts 11e1, 11c1 respectively. Therefore, the first coil-layer 11 has a partially recessed structure in which its upper surface is partially recessed.

The second coil-layer 12 has two turn parts 12c, 12e arranged between a later-described second front shield layer 42 and a second rear shield layer 45. The second coil-layer 12 has a structure which the turn parts 12c, 12e align with each other while interposing the photoresist layer 15 therebetween. The turn parts 12c, 12e correspond to a second turn part according to the embodiment of the present invention. Since the turn part 12e is arranged at a closest position to the ABS 30 of the turn parts 12c, 12e, the turn part 12e corresponds to a second front turn part, the turn part 12c corresponds to a second rear turn part.

As illustrated in FIG. 4, the second coil-layer 12 has a half-loop part 12b extending from a connecting part 12a connected to the first coil-layer 11 to the turn part 12c, a one-loop part 12d extending from the turn part 12c to the turn part 12e, and a half-loop part 12f extending from the turn part 12e to a lead part 13a.

The second coil-layer 12 is constructed as a continuous line from the connecting part 12a to the half-loop part 12f, so as to be wound as a flat spiral about the shield magnetic layer 40, thus forming a two-turn loop as a whole. For convenience of illustration, FIG. 1 illustrates only the connecting part 12a and turn parts 12c, 12e in the second coil-layer 12. Each of the turn parts 12c, 12e also has a vertically long structure similar to the turn parts 11c, 11e. The second coil-layer 12 also has a variable width structure similarly to the first coil-layer 11. The turn parts 12c, 12e are also arranged at positions closer to the ABS 30 than is the rear end part 26b. Therefore, as illustrated in FIG. 4, the turn part 12e and the turn part 12c are arranged at positions closer to the ABS 30 than is a rear end part 45a. The rear end part 45a is a part of the second rear shield layer 45 farthest from the ABS 30.

Further, as illustrated in FIG. 9, FIG. 10, the second coil-layer 12 is formed such that second non-corresponding magnetic pole parts 12e2, 12c2 are larger in coil thickness than second magnetic pole corresponding parts 12e1, 12c1.

The second magnetic pole corresponding parts 12e1, 12c1 mean parts of the second coil-layer 12 corresponding to arrangement spaces of the main magnetic pole layer 26. Further, the second non-corresponding magnetic pole parts 12e2, 12c2 mean parts of the second coil-layer 12 other than the second magnetic pole corresponding parts 12e1, 12c1. In FIG. 8, parts without dots represent the second magnetic pole corresponding parts 12e1, 12c1, and parts with dots represent the second non-corresponding magnetic pole parts 12e2, 12c2.

Here, the coil thickness of the second coil-layer 12 corresponds to a second coil thickness. As illustrated in FIG. 9, FIG. 10, the second coil thicknesses of both of the second magnetic pole corresponding parts 12e1, 12c1 are h21 and the second coil thicknesses of both of the second non-corresponding magnetic pole parts 12e2, 12c2 are h22, and h21<h22 also in this case. Further, the second coil-layer 12 is formed such that the upper surfaces of the second magnetic pole corresponding parts 12e1, 12c1 are recessed with respect to the upper surfaces of the second non-corresponding magnetic pole parts 12e2, 12c2 so that recessed parts 12eg, 12cg are formed in the second magnetic pole corresponding parts 12e1, 12c1 respectively. Therefore, the second coil-layer 12 also has a partially recessed structure similar to that of the first coil-layer 11.

The first coil-layer 11 and the second coil-layer 12 connect with each other as follows, whereby the lower thin-film coil 10 forms a continuous 4-turn loop. Namely, the lead part 13 is connected to the connecting part 11a through the half-loop part 11f, turn part 11e, one-loop part 11d, turn part 11c, and half-loop part 11b, while the connecting part 11a is connected to the connecting part 12a. The connecting part 12a is further connected to the lead part 13a through the half-loop part 12b, turn part 12c, one-loop part 12d, turn part 12e and half-loop part 12f, whereby the 4-turn loop is formed.

Namely, the lower thin-film coil 10 has a (2+2) turn structure in which the first coil-layer 11 forms a 2-turn loop, and the second coil-layer 12 positioned directly thereabove forms a 2-turn loop, thereby yielding a 4-turn loop. The (A+B) turn structure in this embodiment refers to an overlapping structure in which a coil-layer having "B" turns overlies a coil-layer having "A" turns.

Further, the lower thin-film coil 10 has the following story structure. The story structure in this embodiment means a structure in which, for example, in the lower thin-film coil 10, the first coil-layer 11 and the second coil-layer 12 overlie in the vertical direction along the ABS 30, the first magnetic pole corresponding part 11e1 and the second magnetic pole corresponding part 12e1 overlie in the vertical direction, and the first magnetic pole corresponding part 11c1 and the second magnetic pole corresponding part 12c1 overlie in the vertical direction. This structure is illustrated as in FIG. 9, FIG. 10.

The lower thin-film coil 10 further has the following combined recessed parts structure. This combined recessed parts structure means a structure in which the second magnetic pole corresponding parts 12e1, 12c1 fit in the recessed parts 11eg, 11cg formed in the first magnetic pole corresponding parts 11e1, 11c1 respectively. This structure is illustrated, for example, as in FIG. 9, FIG. 10.

Subsequently, the upper thin-film coil 55 will be described. The upper thin-film coil 55 has the first coil-layer 52 and second coil-layer 53 arranged at positions separated from the ABS 30, while an upper conductor group is constituted by the first and second coil-layers 52, 53. In the upper thin-film coil 55, the second coil-layer 53 overlies the first coil-layer 52 while interposing an upper coil-interlayer insulating layer 36 therebetween, similar with the lower thin-film coil 10.

Further, the upper thin-film coil 55 has an equidistant two-stage structure in which the first and second coil-layers 52, 53 have the same front distance and the same rear distance. The front distance of the first and second coil-layers 52, 53 equal to the front distance of the above-described first coil-layer 11, the rear distance of the first and second coil-layers 52, 53 equal to the rear distance of the first coil-layer 11.

The first coil-layer 52 has two turn parts 52c, 52e arranged between a later-described first front shield layer 63 and a first rear shield layer 67. The first coil-layer 52 has a structure which the turn parts 52c, 52e align with each other while interposing a photoresist layer 58 therebetween.

The first coil-layer 52 is wound as a flat spiral about the write shield layer 60, thus forming a two-turn loop as a whole, similarly to the first coil-layer 11. Each of the turn parts 52c, 52e has a vertically long structure similar to that of the turn part 11c, 11e. The first coil-layer 52 is formed such that the non-corresponding magnetic pole parts are larger in coil thickness than the magnetic pole corresponding parts, and thus has a partially recessed structure similar to that of the first coil-layer 11.

The second coil-layer 53 has two turn parts 53c, 53e arranged between a later-described second front shield layer 64 and a second rear shield layer 66. The turn parts 53c, 53e align with each other while interposing a photoresist layer 58 therebetween.

The second coil-layer 53 is also wound as a flat spiral about the write shield layer 60, thus forming a two-turn loop as a whole. Each of the turn parts 53c, 53e has a vertically long structure similar to that of the turn part 11c, 11e. The second coil-layer 53 has a partially recessed structure similar to that of the second coil-layer 12.

The upper thin-film coil 55 yields a 4-turn loop by the first coil-layer 52 and the second coil-layer 53, similar with the lower thin-film coil 10. Namely, the upper thin-film coil 55 has a (2+2) turn structure in which the first coil-layer 52 forms a 2-turn loop, and the second coil-layer 53 positioned directly thereabove forms a 2-turn loop, thereby yielding a 4-turn loop. Further, the upper thin-film coil 55 has the story structure and the combined recessed parts structure similar with the lower thin-film coil 10.

Thus constructed lower thin-film coil 10 and upper thin-film coil 55 form a series of coils, and generate a magnetic field corresponding to data to be recorded on a recording medium in response to a current flowing therethrough.

Next, the main magnetic pole layer 26 will be described. The main magnetic pole layer 26 has a magnetic pole end face 26a on the ABS 30 side, as illustrated in FIG. 2. The magnetic pole end face 26a has a bevel form which is wider on the upper thin-film coil 55 side than on the lower thin-film coil 10 side and gradually decreases its width toward the lower thin-film coil 10. The width of the magnetic pole end face 26a on the upper thin-film coil 55 side defines the track width. The track width is about 0.06 to 0.12 μm, for example. The magnetic pole end face 26a is positioned on the ABS 30.

The main magnetic pole layer 26 includes a track width determining part having the magnetic pole end face 26a, and a wider part which is arranged at a position distanced more from the ABS 30 than is the track width determining part and has a width greater than that of the track width determining part. The track width determining part has a fixed width regardless of the distance from the ABS 30. The wider part has the same width as that of the track width determining part at the boundary with the track width determining part, gradually increases the width as it is distanced more from the ABS 30, and then attains a fixed width. In this embodiment, a part extending from the magnetic pole end part 26a until the width begins to increase is defined as the track width determining part.

As illustrated in FIG. 1, the main magnetic pole layer 26 has an upper surface 26c on the side far from the substrate 1 which is a flat surface along a direction intersecting the ABS 30. Further, a part on the ABS 30 side of a lower surface 26d on the substrate 1 side of the main magnetic pole layer 26 is a fitting part 26d1 that fits in the recessed parts 12eg, 12cg of the magnetic pole corresponding parts 12e1, 12c1. The fitting part 26d1 is connected to the bottom insulating layer 24.

Further, a bottom surface 26f of the fitting part 26d1 is arranged at a position closer to the substrate 1 than is the uppermost surfaces on the side farthest from the substrate 1 in the first coil-layer 11 and the second coil-layer 12. The uppermost surfaces on the side farthest from the substrate 1 in the first coil-layer 11 and the second coil-layer 12 correspond to the upper surfaces of the second non-corresponding magnetic pole parts 12e2, 12c2. Therefore, the bottom surface 26f is arranged at a position closer to the substrate 1 than are the upper surfaces of the second non-corresponding magnetic pole parts 12e2, 12c2. Further, in the main magnetic pole layer 26, a part farther from the ABS 30 than is the fitting part 26d1 is connected to the second rear shield layer 45.

The main magnetic pole layer 26 transmits therethrough a magnetic flux corresponding to a magnetic field generated by the lower thin-film coil 10 and the upper thin-film coil 55, and generates a recording magnetic field for recording data onto a recording medium by the perpendicular magnetic recording scheme.

The length of the track width determining part from the ABS 30 is referred to as neck height. The neck height is about 0.05 to 0.3 μm, for example.

The gap layer 27 is arranged between the main magnetic pole layer 26 and an opposing shield layer 61. The gap layer 27 is formed on the upper face 26c of the main magnetic pole layer 26. The gap layer 27 is formed using nonmagnetic material such as alumina ($Al_2O_3$) or the like.

The shield magnetic layer 40 has a first front shield layer 41, a second front shield layer 42, a connecting shield layer 43, a first rear shield layer 44, and a second rear shield layer 45.

The first and second front shield layers 41, 42 are arranged closer to the ABS 30 than are the first coil-layer 11 and the second coil-layer 12, respectively. The second front shield layer 42 overlies the first front shield layer 41, so that the first and second front shield layers 41, 42 form a two-stage structure in which their respective rear side faces farther from the ABS 30 are equidistant from the ABS 30. The connecting shield layer 43 is formed such as to straddle the lower thin-film coil 10, thereby connecting the first front shield layer 41 and the rear shield layer 44 to each other.

The first and second rear shield layers 44, 45 are arranged farther from the ABS 30 than are the first and second coil-layers 11, 12, respectively. The second rear shield layer 45 overlies the first rear shield layer 44, so that the first and second rear shield layers 44, 45 form a two-stage structure in which their respective front side faces closer to the ABS 30 are equidistant from the ABS 30.

The write shield layer 60 has an opposing shield layer 61,62, a first front shield layer 63, a second front shield layer 64, a connecting shield layer 65, a second rear shield layer 66, a first rear shield layer 67, and the upper yoke layer 68, 69.

The opposing shield layers 61, 62 have end faces exposed at the ABS 30. The opposing shield layer 61 is formed such as to oppose the main magnetic pole layer 26 through the gap layer 27. The opposing shield layer 61 has a flat upper face, to which the opposing shield layer 62 is connected.

The first and second front shield layers 63, 64 are arranged closer to the ABS 30 than are the first and second coil-layers 52, 53, respectively. The second front shield layer 64 overlies the first front shield layer 63, so that the first and second front shield layers 63, 64 form a two-stage structure in which their respective rear side faces farther from the ABS 30 are equidistant from the ABS 30. The connecting shield layer 65 is formed such as to straddle the upper thin-film coil 55, thereby connecting the second front shield layer 64 and the second rear shield layer 66 to each other.

The first and second rear shield layers 67, 66 are arranged farther from the ABS 30 than are the first and second coil-layers 52, 53, respectively. The second rear shield layer 66 overlies the first rear shield layer 67, so that the first and second rear shield layers 67, 66 form a two-stage structure in which their respective front side faces closer to the ABS 30 are equidistant from the ABS 30.

The upper yoke layer 68 is connected to the first rear shield layer 67 and the upper yoke layer 69. The upper yoke layer 69 is connected to the upper yoke layer 68 and the main magnetic pole layer 26.

The bottom insulating layer 24 forms a part being a bottom of the arrangement space where the main magnetic pole layer 26 is arranged. The bottom insulating layer 24 is formed in a manner to be in contact with the upper surfaces of the second magnetic pole corresponding parts 12e1, 12c1. On the upper surface of the bottom insulating layer 24, the main magnetic pole layer 26 is formed.

(Method of Manufacturing Thin-Film Magnetic Head)

A method of manufacturing the thin-film magnetic head 300 having the structure mentioned above will now be explained with reference to FIG. 11(a), FIG. 11(b) to FIG. 23(a), FIG. 23(b) together with FIG. 1, FIG. 2 mentioned above.

FIG. 11(a) to FIG. 23(a) is sectional view corresponding to FIG. 1 in respective step of manufacturing the thin-film magnetic head 300, while FIG. 11(b) to FIG. 23(b) is front view similarly corresponding to FIG. 2.

First, the substrate 1 made of a ceramic material such as aluminum oxide-titanium carbide ($Al_2O_3$.TiC) is prepared. Subsequently, as shown in FIG. 11(a), FIG. 11(b), the insulating layer 2 made of an insulating material such as alumina ($Al_2O_3$) and the lower shield layer 3 made of a magnetic material are successively formed on the substrate 1. Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material, the upper shield layer 6 is formed on the shield gap film 4.

Next, the insulating layer 7 for separating the upper shield layer 6 and a recording head to be formed later from each other is formed by an insulating material such as alumina ($Al_2O_3$). The foregoing steps yield a multilayer body for forming the recording head. Thereafter, a magnetic layer (having a thickness of about 0.5 μm) for forming the connecting shield layer 43 is formed by using a magnetic material such as NiFe or CoNiFe or the like, so as to form an insulating layer on the surface of the multilayer body, and the surface of the multilayer body is flattened by chemical mechanical polishing (hereinafter, referred to as "CMP"). This forms a lower opposing insulating layer 17 and the connecting shield layer 43. Here, the connecting shield layer 43 is formed such as to be separated from the ABS 30 by 0.3 to 1 μm (about 0.6 μm in this embodiment).

Subsequently, an insulating layer 18 (having a thickness of about 0.2 to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18. Thereafter, by frame plating using a magnetic material such as NiFe or CoNiFe or the like, the first front shield layer 41 and the first rear shield layer 44 are formed by a thickness of about 2 µm each.

Next, as illustrated in FIG. 12(a), FIG. 12(b), an insulating layer 19 (having a thickness of about 0.02 to 0.3 µm, preferably about 0.1 to 0.2 µm) made of alumina ($Al_2O_3$) is formed on the whole surface of the multilayer body by CVD (Chemical Vapor Deposition) according to an atomic layer method so as to cover the first front shield layer 41 and the first rear shield layer 44.

Then, a first conductor layer forming step is performed. In the first conductor layer forming step, first, a conductor layer 70 is formed between the first front shield layer 41 and the first rear shield layer 44 by frame plating. The conductor layer 70 will later become the first coil-layer 11. The conductor layer 70 is formed between the first front shield layer 41 and the first rear shield layer 44 such as to have an interstice 70a at the center and come into contact with the first front shield layer 41 and the first rear shield layer 44 through the insulating layer 19 without gaps. The conductor layer 70 is an intermittent conductor layer, since it is provided with one interstice 70a at the center.

Next, as illustrated in FIG. 13(a), FIG. 13(b), a photoresist layer 80 (having a thickness of about 2 to 3 µm) is formed at the interstice 70a in the conductor layer 70, and an insulating film 20 adapted to cover the surface of the multilayer body is formed using alumina ($Al_2O_3$) by a thickness of about 3 to 4 µm. Subsequently, the surface of the multilayer body is polished by CMP until the first front shield layer 41 and the first rear shield layer 44 emerge, so as to become flat. This forms a conductor layer 11X as illustrated in FIG. 14(a), FIG. 14(b). The conductor layer 11X will later become the first coil-layer 11.

In this event, the surface of the multilayer body is polished so that the thickness of the conductor layer 11X is about 1.8 µm to 3 µm. Further, a first coil thickness changing step on the conductor layer 11X is carried out afterward to form the above-described recessed parts 11eg, 11cg in the surfaces of later-described first corresponding parts, thereby partially reducing the thickness of the conductor layer 11X. For this reason, in the first conductor layer forming step, the conductor layer 11X having a large thickness is formed. Further, by the first conductor layer forming step, the first lower opposing insulating layer 20 is also formed on the side closer to the ABS 30 than is the first front shield layer 41.

Subsequently, as illustrated in FIG. 15(a), FIG. 15(b), an insulating layer (having a thickness of about 0.1 to 0.15 µm) made of alumina ($Al_2O_3$) is formed on the whole surface of the multilayer body. This insulating layer will later become the lower interlayer insulating layer 21.

Then, the first coil thickness changing step is carried out. In this first coil thickness changing step, etching is performed on the surfaces of first corresponding parts 11ee, 11cc (see FIG. 14(a), (b)) of the conductor layer 11X, the first front shield layer 41, and the first lower opposing insulating layer 20 to form the recessed parts 11eg, 11cg (first recessed parts) in the surfaces of the first corresponding parts 11ee, 11cc. Further, recessed parts are formed also in the surface of the first front shield layer 41 and the surface of the first lower opposing insulating layer 20. The first corresponding parts 11ee, 11cc are parts of the conductor layer 11X corresponding to the arrangement spaces where the main magnetic pole layer 26 is arranged afterwards. Since the recessed parts need to be formed also in the surfaces of the first front shield layer 41 and the lower opposing insulating layer 20 in order to reserve the arrangement spaces of the main magnetic pole layer 26, recessed parts are formed also in the surfaces in a manner to join with the recessed parts 11eg, 11cg without level differences.

By performing the first coil thickness changing step, the first coil-layer 11 with the above-described partially recessed structure is able to be formed. Further, recessed parts 20a, 41a are formed in the first lower opposing insulating layer 20 and the first front shield layer 41. The first lower opposing insulating layer 20 and the first front shield layer 41 are also able to be formed in the partially recessed structure.

Then, after an opening is selectively made in the insulating layer which will be the lower interlayer insulating layer 21 afterwards as illustrated in FIG. 16(a), FIG. 16(b), a second front shield layer 42 and a second rear shield layer 45 are formed to overlie in the opened part each in a thickness of 0.7 µm to 1.5 µm by the frame plating method using a magnetic material such as NiFe or CoNiFe. Since the recessed part 41a has been formed in the first front shield layer 41, the second front shield layer 42 is formed to partially fit in the recessed part 41a.

Further, a coil-interlayer insulating layer forming step is carried out. In this step, an insulating layer 22 (with a film thickness of about 0.1 µm to 0.15 µm) made of alumina ($Al_2O_3$) is formed on the entire surface of the multilayer body. This insulating layer 22 is formed by CVD (Chemical Vapor Deposition) method by the atomic layer method in a manner to cover the first coil-layer 11, the second front shield layer 42, and the second rear shield layer 45. This insulating layer 22 will be a coil-interlayer insulating layer 22 afterwards.

Next, a second conductor layer forming step is performed. In this step, first, a conductor layer 71 is formed by frame plating. The conductor layer 71 is formed on the surface of the multilayer body at a position separated from the ABS 30 equidistantly as the conductor layer 11X. The conductor layer 71 will later become the second coil-layer 12. The conductor layer 71 is formed with a form provided an interstice, similar with the conductor layer 70.

Next, a photoresist layer 81 is formed at the interstice. Thereafter, as illustrated in FIG. 17(a), FIG. 17(b), an insulating film adapted to cover the surface of the multilayer body is formed using alumina ($Al_2O_3$) by a thickness of about 2 µm to 3 µm. This insulating film will later form a second lower opposing insulating layer 23.

Thereafter, as illustrated in FIG. 18(a), FIG. 18(b), the surface of the multilayer body is polished by CMP until the second front shield layer 42 and the second rear shield layer 45 emerge, so as to become flat. This forms a conductor layer 12X. The conductor layer 12X will later become the second coil-layer 12.

In this event, the surface of the multilayer body is polished so that the thickness of the conductor layer 12X is about 1.8 µm to 3 µm. Further, a second coil thickness changing step on the conductor layer 12X is carried out afterward to form the above-described recessed parts 12eg, 12cg in the surfaces of later-described second corresponding parts, thereby partially reducing the thickness of the conductor layer 12X. For this reason, in the second conductor layer forming step, the conductor layer 12X having a large thickness is formed. Further, by the second conductor layer forming step, the second lower opposing insulating layer 23 is formed.

Subsequently, the second coil thickness changing step is carried out. In this second coil thickness changing step, as illustrated in FIG. 19(a), FIG. 19(b), etching is performed on the surfaces of second corresponding parts 12ee, 12cc (see FIG. 18(a), (b)) of the conductor layer 12X, the second front shield layer 42, and the second lower opposing insulating layer 23 to form the recessed parts 12eg, 12cg (second recessed parts) in the surfaces of the second corresponding parts 12ee, 12cc and recessed parts are formed also in the surface of the second front shield layer 42 and the surface of the second lower opposing insulating layer 23. The second corresponding parts 12ee, 12cc are parts of the conductor layer 12X corresponding to the arrangement spaces where the main magnetic pole layer 26 is arranged afterwards. In order to reserve the arrangement spaces of the main magnetic pole layer 26, recessed parts are formed in the surfaces of the second front shield layer 42 and the second lower opposing insulating layer 23 in a manner to join with the recessed parts 12eg, 12cg without level differences. In this event, in the second front shield layer 42, a part where the recessed part is formed corresponds to a corresponding shield layer, and a part other than the corresponding shield layer corresponds to a non-corresponding shield layer.

By performing the second coil thickness changing step, the second coil-layer 12 with the above-described partially recessed structure is able to be formed. Further, recessed parts 23a, 42a are formed in the second lower opposing insulating layer 23 and the second front shield layer 42. They are also able to be formed in the partially recessed structure. Furthermore, the second magnetic pole corresponding parts 12e1, 12c1 fit in the recessed parts 11eg, 11cg respectively, so that the above-described combined recessed parts structure is obtained.

By the steps so far, the lower thin-film coil 10 with the equidistant two-stage structure, the partially recessed structure, the story structure, and the combined recessed parts structure is formed.

Then, a bottom insulating layer forming step is carried out. In this step, the base insulating layer 24X is first formed using an insulating material such as alumina (Al$_2$O$_3$) or the like as illustrates in FIG. 20(a), FIG. 20(b). The base insulating layer 24X is formed to fill the arrangement space with the above described recessed parts 12eg, 12cg and the recessed parts 23a, 42a forming the bottom. Subsequently, photoresist is applied on the surface of the multilayer body and then patterned using a predetermined photomask to form a resist pattern to expose the surface of the base insulating layer 24X in the shape corresponding to the main magnetic pole layer 26.

Next, using the resist pattern as a mask, reactive ion etching (which will hereinafter be referred to as "RIE") is performed, so as to remove the part of the base insulating layer 24X not covered with the resist pattern. This forms a recess part (this recess part also be referred to as cavity) 24a corresponding to the main magnetic pole layer 26 in the base insulating layer 24X. For forming the main magnetic pole layer 26 with designed size and form, the cavity 24a is made by depressing a part of the base insulating layer 24X into a form corresponding to the outer form of the main magnetic pole layer 26. The above-described bottom insulating layer 24 is formed by the remaining base insulating layer 24X after forming of the cavity 24a.

Then, a main magnetic pole layer forming step is carried out. In this step, as illustrated in FIG. 22(a), FIG. 22(b), the main magnetic pole layer 26 is formed on the surface of the multilayer body by sputtering using a magnetic material such as CoNiFe, CoFe, or NiFe. The main magnetic pole layer 26 is formed in a thickness of, for example, about 0.5 to 0.8 μm on the bottom insulating layer 24.

Subsequently, as illustrated in FIG. 23(a), FIG. 23(b), the gap layer 27 (having a thickness of about 250 Å to 350 Å) is formed on the whole surface of the multilayer body by sputtering or CVD with a nonmagnetic insulating material such as alumina (Al$_2$O$_3$) or a nonmagnetic conductive material such as Ru, NiCu, or Ta. Then, etching such as RIE is performed, so as to remove the part of the gap layer 27.

Next, a magnetic layer having a thickness of about 0.5 to 1.0 μm is formed on the whole surface of the multilayer body by plating with a magnetic material such as CoNiFe, CoFe, CoFeN, or NiFe. This magnetic layer will later become the opposing shield layer 61 and the upper yoke layer 69. Subsequently, an insulating layer (having a thickness of about 1 to 3 μm) is formed on the whole surface of the multilayer body by an insulating material such as alumina (Al$_2$O$_3$). Further, the whole surface of the multilayer body is polished by CMP, so as to become flat. This forms the opposing shield layer 61, the upper yoke layer 69. At this time, the surface of the multilayer body is polished such that the opposing shield layer 61 has a thickness of about 0.3 to 0.7 μm.

Subsequently, a magnetic layer having a thickness of about 0.5 to 1.0 μm is formed on the whole surface of the multilayer body by plating with a magnetic material such as CoNiFe, CoFe, CoFeN, or NiFe. This magnetic layer will later become the opposing shield layer 62 and the upper yoke layer 68. Subsequently, an insulating layer (having a thickness of about 1 to 3 μm) is formed on the whole surface of the multilayer body by an insulating material such as alumina (Al$_2$O$_3$). Further, the whole surface of the multilayer body is polished by CMP, so as to become flat. This forms the opposing shield layer 62, the upper yoke layer 68.

Thereafter, the upper thin-film coil 55 is formed by the same procedure as that in forming the lower thin-film coil 10. Further, the first front shield layer 63, the second front shield layer 64, the first rear shield layer 67 and the second rear shield layer 66 are formed by the same procedure as that in forming the first and second front shield layer 41, 42 and the first and second rear shield layer 44, 45.

Since recessed parts similar to those in the first coil-layer 11 and the second coil-layer 12 are formed also in the first coil-layer 52 and the second coil-layer 53 constituting the upper thin-film coil 55, an insulating layer is formed on the entire surface of the multilayer body using an insulating material such as alumina (Al$_2$O$_3$) or the like in a manner to fill the recessed parts. Parts of the insulating layer which are formed on the surfaces of the second front shield layer 64 and the second rear shield layer 66 are removed by etching. This forms a buried insulating layer 56 in the upper thin-film coil 55. Subsequently, a magnetic layer is further formed using a magnetic material such as CoNiFe, CoFe, CoFeN, NiFe or the like. This magnetic layer will be a connecting shield layer 65. Subsequently, an insulating layer is formed using an insulating material such as alumina (Al$_2$O$_3$) or the like on the entire surface of the multilayer body. Thereafter, the surface of the multilayer body is flattened by CMP. This forms an insulating layer 39 to complete the thin-film magnetic head 300.

(Operation and Effect of Thin-Film Magnetic Head 300)

As in the foregoing, the thin-film magnetic head 300 has the lower thin-film coil 10 and the upper thin-film coil 55. The lower thin-film coil 10 and the upper thin-film coil 55 have (2+2) turn structure. Therefore, the lower thin-film coil 10 and the upper thin-film coil 55 are able to secure 4 turns respectively, while having only 2 turns per plane. This allows the thin-film magnetic head 300 to reduce the depth from the ABS 30 and make the magnetic path length shorter as compared with the case where turn parts are arranged in a row in a direction intersecting the ABS so as to secure 4 turns as in the conventional thin-film magnetic head 400.

Hence, the thin-film magnetic head 300 is able to improve the flux rise time, non-linear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

Figure 32:
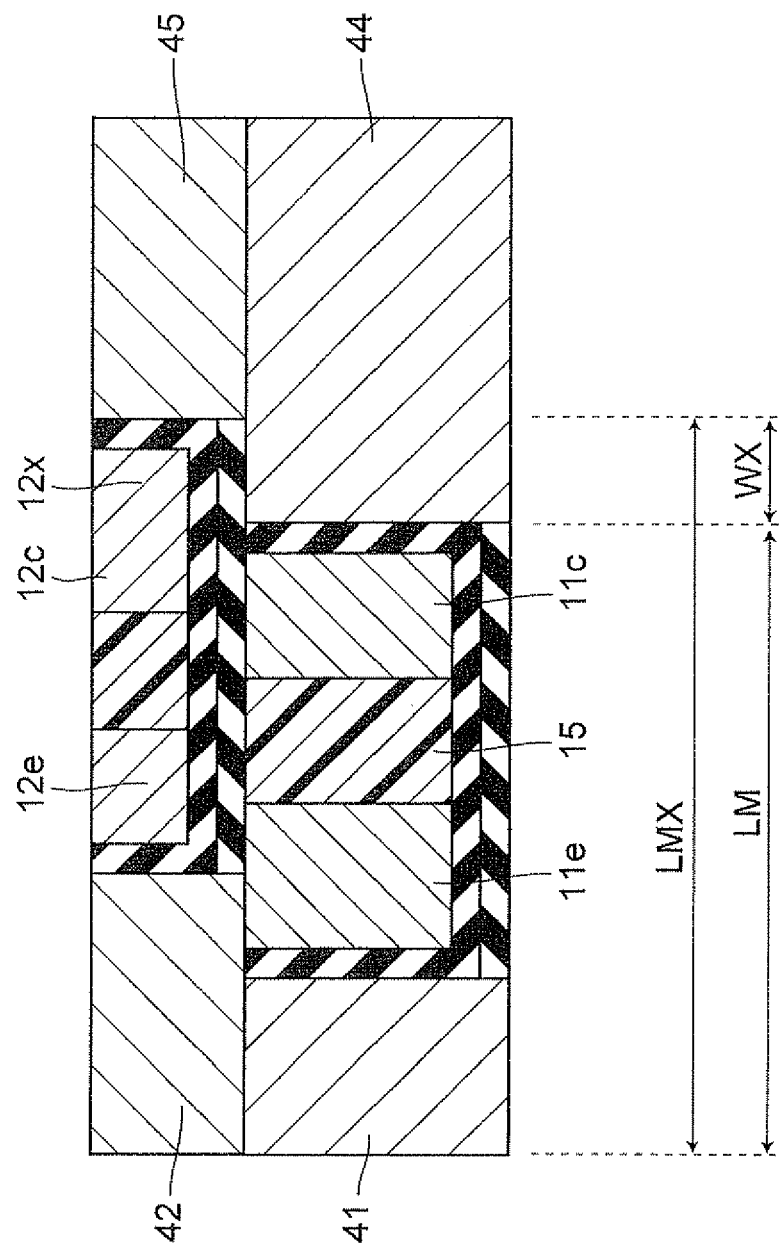
FIG. 32 is a sectional view illustrating a turn part of a lower thin-film coil of thin-film magnetic head related to the present invention.
Figure 33:
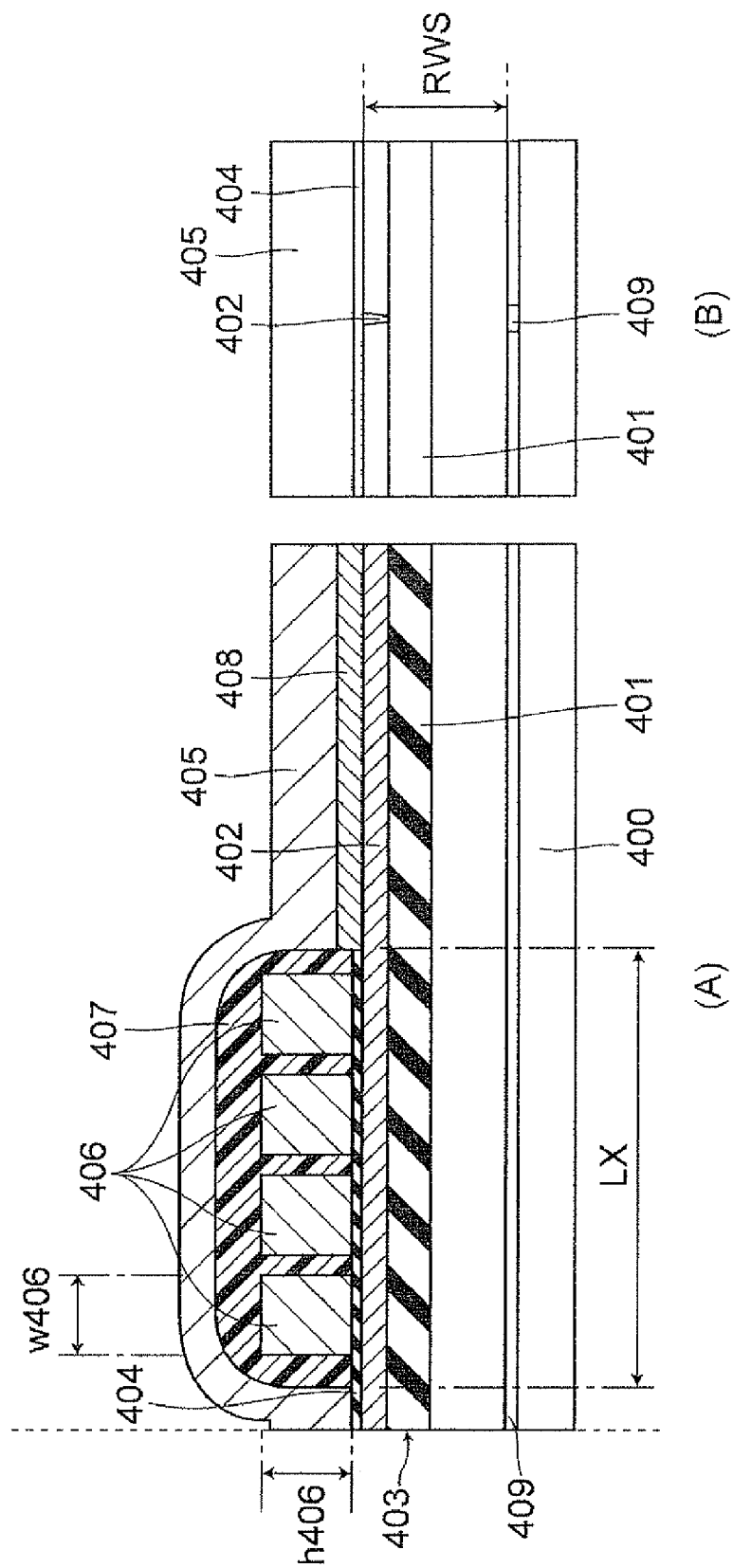
FIG. 33 is a view illustrating an example of a conventional thin-film magnetic head, in which (a) is a sectional view, in which (b) is a front view illustrating an ABS.

Further, the lower thin-film coil 10 and the upper thin-film coil 55 has the above-described equidistant two-stage structure. In this regard, a two-stage structure in which the second coil-layer 12 is simply stacked on the first coil-layer 11 may yield a vertically nonoverlapping part (nonmultiple part) in a part of the first coil-layer 11 or second coil-layer 12. When turn parts 12c, 12e distanced more from the ABS 30 than is the first coil-layer 11 are formed between the second front shield layer 42 and the second rear shield layer 45 as illustrated in FIG. 32, for example, a nonmultiple part 12X not overlapping the first coil-layer 11 is formed in the turn part 12c. In this case, the existence of the nonmultiple part 12X increases the depth of the lower thin-film coil 10 from the ABS 30, thereby making the magnetic path length LMX greater than the magnetic path length LM by WX.

Therefore, the thin-film magnetic head 300 employs an equidistant two-stage structure having the same front distance and the same rear distance, so that the first and second coil-layers 11, 12, the first and second coil-layers 52, 53 have both of their front and rear side faces aligned. This inhibits the thin-film magnetic head 300 from yielding the nonmultiple part 12X, so that the magnetic path length LM can be made shorter, whereby the flux rise time and the like of the recording head can further be improved.

Further, the lower thin-film coil 10 and the upper thin-film coil 55 have the two-stage structure composed of the first and second coil-layers 11, 12 and the first and second coil-layers 52, 53 respectively. Therefore, the number of turns can be increased than in the case of a single story of the coil-layer (for example, referred also to as a single story structure in the conventional PMR 400), without increasing the magnetic path length. Further, even when the number of turns per one story in the lower thin-film coil 10 and the upper thin-film coil 55 is decreased to be smaller than that of the single story structure, the number of turns equal to that of the single story structure can be ensured. Accordingly, the width of each turn part can be made large. This reduces the electric resistances of the lower thin-film coil 10 and the upper thin-film coil 55, thereby making it possible to suppress the heating values of the lower thin-film coil 10 and the upper thin-film coil 55.

Therefore, even when a current is caused to flow through the lower thin-film coil 10 and upper thin-film coil 55, the photoresist layers 15, 58 are harder to be expanded by the heat generated by the lower thin-film coil 10 and upper thin-film coil 55. This makes it difficult for the first front shield layer 41, the second front shield layer 42, the first front shield layer 63, the second front shield layer 64 to be pushed out toward the ABS 30.

Hence, the thin-film magnetic head 300 can restrain the shield magnetic layer 40 and write shield layer 60 from projecting as the lower thin-film coil 10 and upper thin-film coil 55 generate heat. Consequently, the thin-film magnetic head 300 is very unlikely to be damaged by the protrusion of the recording head and thus can approach recording media.

While the thin-film magnetic head 300 is incorporated in an undepicted slider, the flying height of the slider from the recording medium surface can be reduced. Therefore, the thin-film magnetic head 300 can enhance the resolution of recording and reproducing heads, thereby improving their signal-to-noise ratio. A structure such as that of the thin-film magnetic head 300 can also increase the yield of PMR having a high recording density.

In particular, in the case of the thin-film magnetic head 300, the lower thin-film coil 10 has the story structure, the partially recessed structure, and the combined recessed parts structure. The lower thin-film coil 10 has the first coil-layer 11 and the second coil-layer 12, and the thickness of the non-corresponding magnetic pole parts is larger than the thickness of the magnetic pole corresponding part both in the first coil-layer 11 and the second coil-layer 12. Thus, parts with a larger thickness extend substantially entirely over each of the first coil-layer 11 and second coil-layer 12 and a part with a smaller thickness exists at a very limited position in each of the first coil-layer 11 and second coil-layer 12. Therefore, the electric resistance of the lower thin-film coil 10 can further reduce to further suppress the heating values of the first and second coil-layers 11, 12.

By increasing the thicknesses of the entire first coil-layer 11 and second coil-layer 12, the electric resistances of the first and second coil-layers 11, 12 can be reduced to suppress their heating values. However, when the thin-film coil (the lower thin-film coil 10) is arranged between the main magnetic pole layer 26 and the reproducing head as in the thin-film magnetic head 300, the interval between the main magnetic pole layer 26 and the reproducing head needs to be widened accompanying the increase in the thicknesses of the first coil-layer 11 and the second coil-layer 12, thus making it difficult to keep RWS within a certain range.

For this reason, the lower thin-film coil 10 corresponding to the substrate side coil-layer has the partially recessed structure and the combined recessed parts structure in the thin-film magnetic head 300.

In the lower thin-film coil 10, there are a part affecting RWS (hereinafter, referred to as an "affecting part") and a part not affecting. In this embodiment, focusing attention to this point, the thickness of the former part (the affecting part) is kept at a size capable of keeping RWS within the restriction range, whereas the thickness of the latter part is set to be larger than the thickness of the former part. The affecting part is the above-described first, second magnetic pole corresponding part 11e1, 11c1, 12e1, 12c1. This configuration makes it possible to further reduce the magnitude of the electric resistance of the lower thin-film coil 10 to further suppress the heating value within the restriction range of RWS.

Therefore, according to the thin-film magnetic head 300, the electric resistance of the lower thin-film coil 10 can be reduced within the restriction range of RWS without increasing the magnetic path length to prevent protrusion of a part of the ABS 30.

In addition, the lower thin-film coil 10 has the overlapping structure of (2+2) turns and the combined recessed parts structure. In the thin-film coil formed in the overlapping structure, coil-layers are arranged along the ABS 30 and thereby can shorten the magnetic path length. However, the thin-film coil becomes large in thickness as a whole and accordingly greatly affects RWS, thus making it difficult to keep RWS within its restriction range. However, the thin-film coil is formed in the story structure even if it is in the overlapping structure, whereby the recessed parts 11eg, 11cg on the lower side and the recessed parts 12eg, 12cg on the upper side are arranged along the ABS 30 and thereby can reduce the thickness of the affecting part in the thin-film coil.

For example, in the case where the number of turns in the thin-film coil is four, even when it is in a four-turn one-story structure as in the conventional PMR 400, the thin-film coil is formed in the partially recessed structure to make it possible to reduce the magnitude of the electric resistance of the thin-film coil to suppress the heating value. However, in the four-turn one-story structure, all of the turn parts in the thin-film coil are arranged in the direction intersecting the ABS, so that it is difficult to shorten the magnetic path length.

On the other hand, when the thin-film coil is formed in the overlapping structure with the (2+2) turns as in lower thin-film coil 10, the turn parts of the thin-film coil are arranged not only in the direction intersecting the ABS but also in the direction along the ABS, and therefore it is possible to shorten the magnetic path length. In this case, only by forming the first coil-layer 11 on the lower side in the partially recessed structure, RWS becomes small and the effect of the thickness of the thin-film coil exerting RWS can be reduced. However, by forming the thin-film coil additionally in the story structure as in the lower thin-film coil 10, the recessed parts 11eg, 11cg on the lower side and the recessed parts 12eg, 12cg on the upper side are arranged in the direction along the ABS, so that the thickness of the affecting part in the thin-film coil can be reduced to further reduce the effect of the thickness of the thin-film coil exerting RWS. In addition, since the lower thin-film coil 10 is formed in the combined recessed parts structure, the second magnetic pole corresponding parts 12e1, 12c1 on the upper side fit in the recessed parts 11eg, 11cg on the lower side, whereby the thickness of the affecting part in the thin-film coil is further reduced. Therefore, the effect of the thickness of the thin-film coil exerting RWS is able to be further effectively reduced.

As described above, the thin-film magnetic head 300 is configured to be able to reduce the magnitude of the electric resistance of the lower thin-film coil 10 within the restriction range of RWS to suppress the heating value. Further, the thin-film magnetic head 300 achieve the excellent operation and effect capable of also shortening the magnetic path length.

Since the lower thin-film coil 10 and upper thin-film coil 55 have the variable width structures as mentioned above, current flows are less likely to be obstructed, whereby the resistance value is able to be restrained from rising.

Second Embodiment

Figure 24:
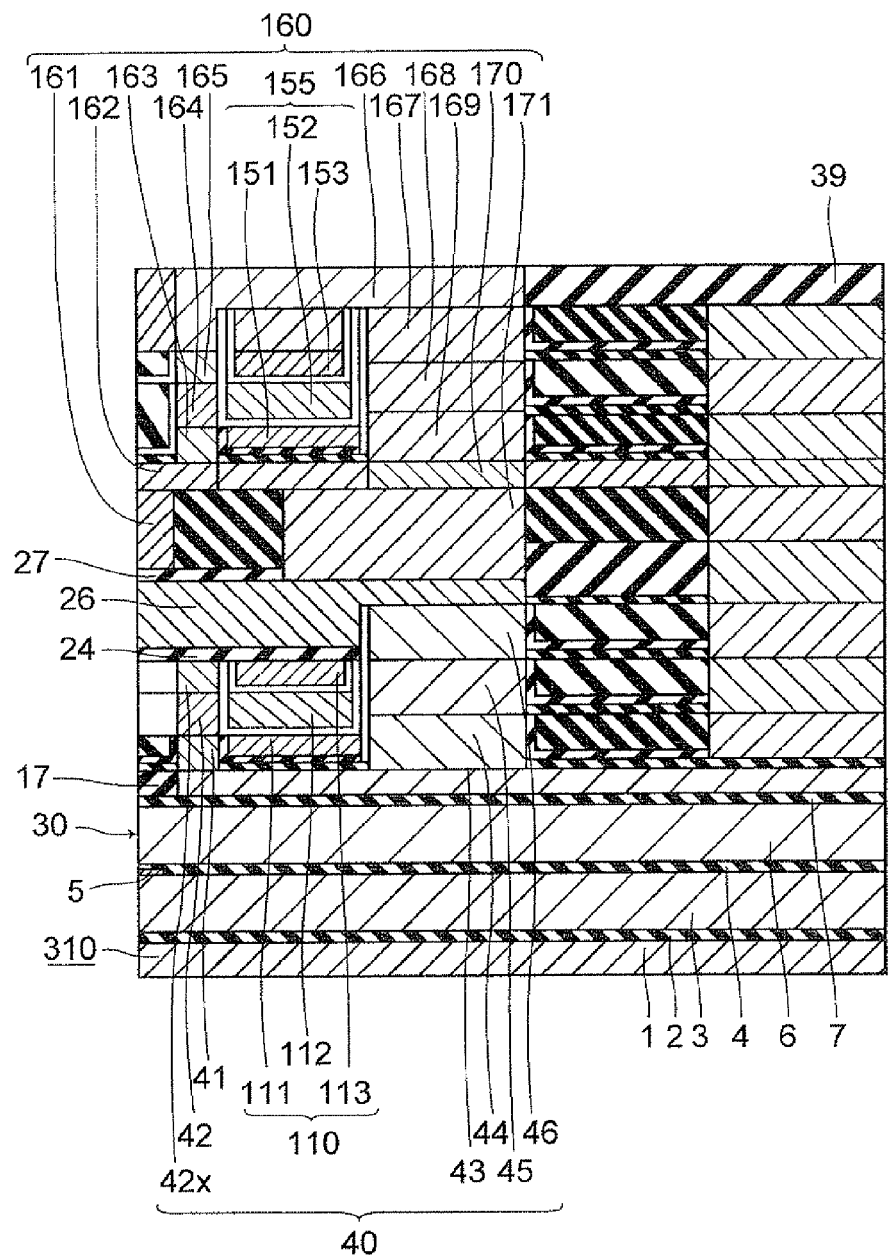
FIG. 24 is a sectional view of the thin-film magnetic head according to a second embodiment of the present invention corresponding to FIG. 1, along by a direction intersecting its air bearing surface.
Figure 25:
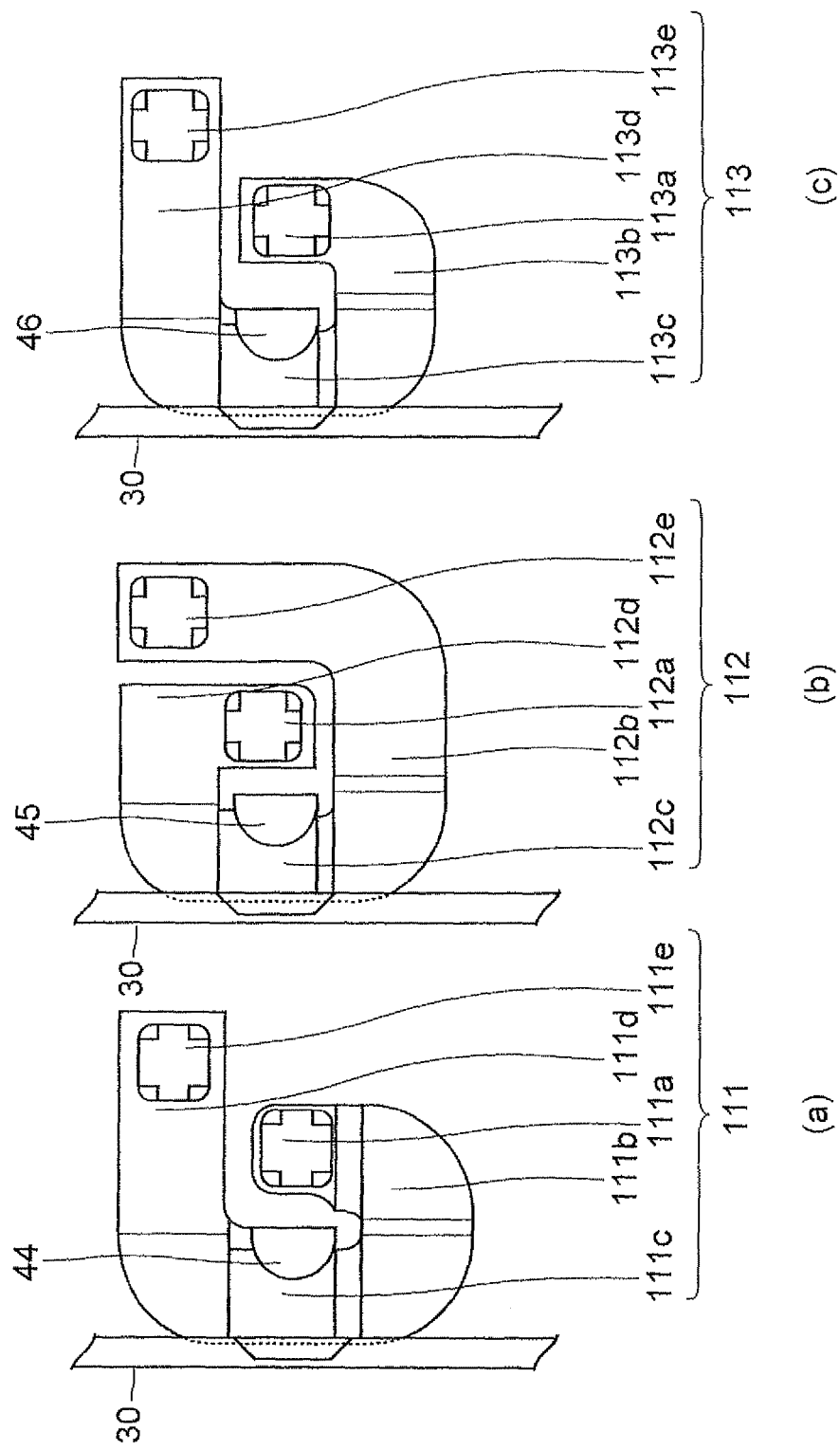
FIG. 25 illustrates a thin-film coil constitutes the thin-film magnetic head in FIG. 24, in which (a) is a plan view illustrating the first coil-layer, in which (b) is a plan view illustrating the second coil-layer, in which (c) is a plan view illustrating a third coil-layer.
Figure 26:
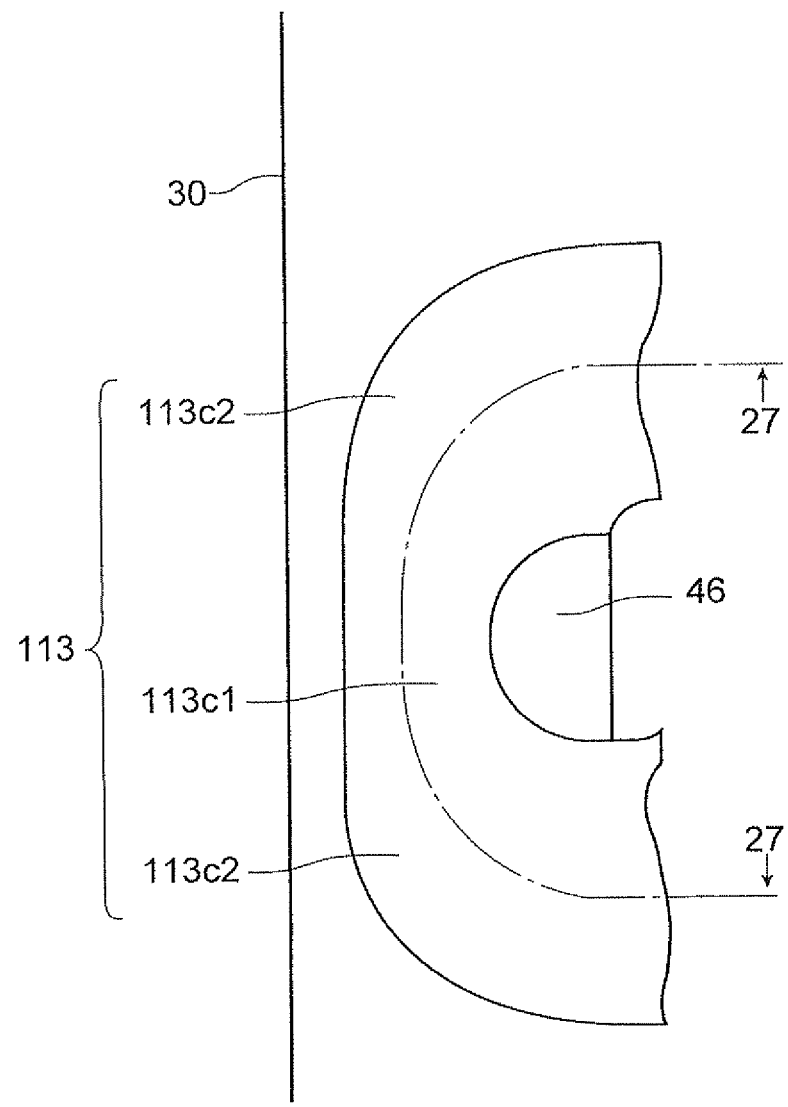
FIG. 26 is a plan view illustrating a principal part of the third coil-layer laid on the first coil-layer, the second coil-layer.
Figure 27:
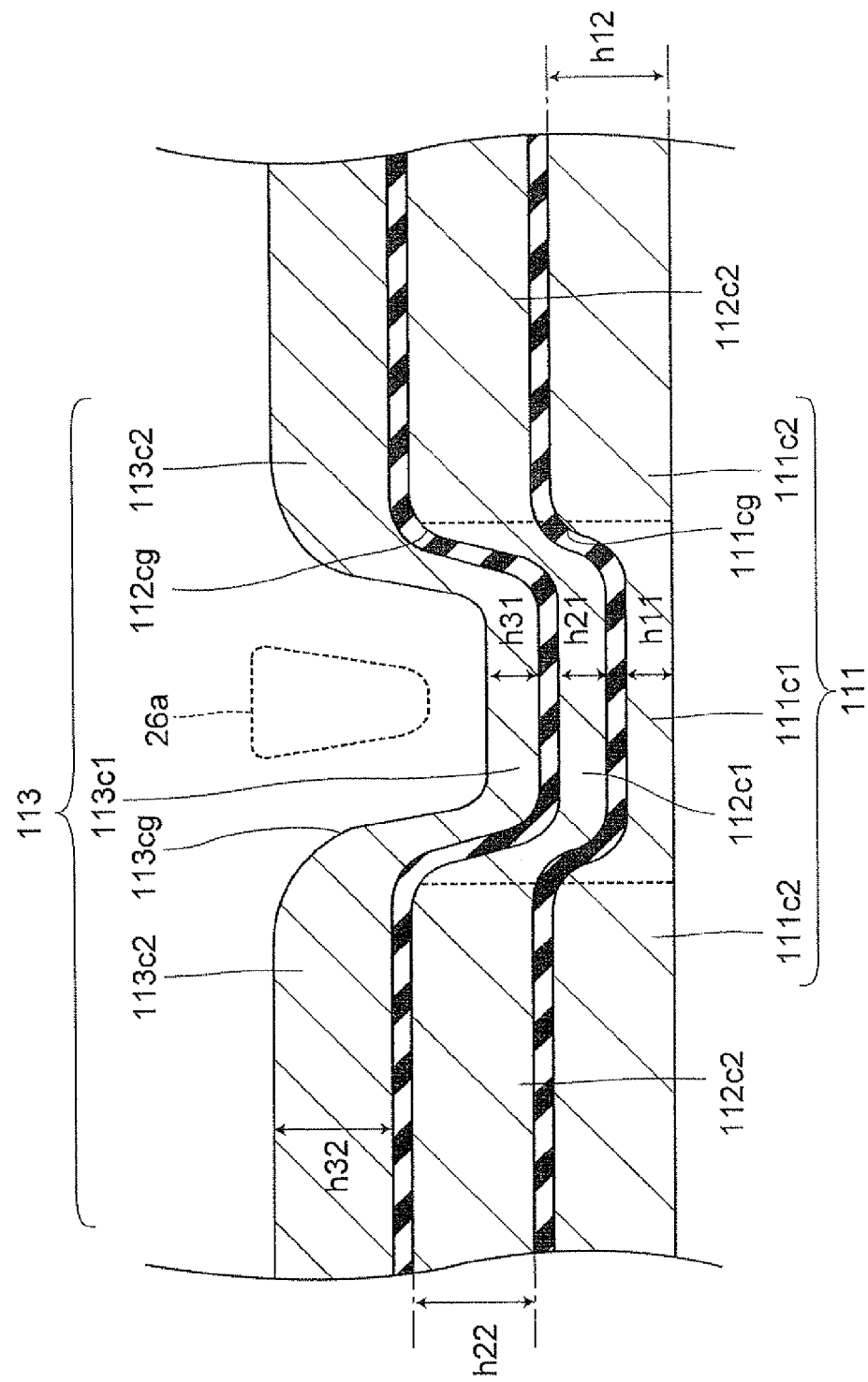
FIG. 27 is a sectional view taken along the line 27-27 in FIG. 26.

The structure of a thin-film magnetic head of perpendicular magnetic recording type according to the second embodiment of the present invention will now be explained with reference to FIG. 24 to FIG. 27. Here, FIG. 24 is a sectional view of the thin-film magnetic head 310 according to a second embodiment of the present invention corresponding to FIG. 1, along by a direction intersecting ABS 30. FIG. 25 is a plan view illustrating a first, second, third coil-layers 111, 112, 113. FIG. 26 is a plan view illustrating a principal part of the third coil-layer 113 laid on the first, second coil-layers 111, 112. FIG. 27 is a sectional view taken along the line 27-27 in FIG. 26.

As with the thin-film magnetic head 300, the thin-film magnetic head 310 comprises a substrate 1 and reproducing and recording heads laminated on the substrate 1, while having the ABS 30. Since the thin-film magnetic head 310 includes configurations identical to those of the thin-film magnetic head 300, configurations of the thin-film magnetic head 310 different from those of the thin-film magnetic head 300 will mainly be explained in the following, while omitting or simplifying their common configurations.

As in the thin-film magnetic head 300, the reproducing head includes an insulating layer 2, a lower shield layer 3, a shield gap film 4, an MR device 5, an upper shield layer 6, and an insulating layer 7 which are formed on the substrate 1.

The recording head includes a lower thin-film coil 110, a bottom insulating layer 24, a main magnetic pole layer 26, a gap layer 27, a shield magnetic layer 40, an upper thin-film coil 155, and write shield layer 160 which are laminated on the substrate 1. The recording head has the lower thin-film coil 110 and the upper thin-film coil 155.

The above-described lower thin-film coil 10 has the (2+2) turn structure, namely, a two-turn two-story structure, whereas the lower thin-film coil 110 has a (1+1+1) turn structure, namely, a one-turn three-story structure.

The lower thin-film coil 110 has a first, second, and third coil-layers 111, 112, 113 and has an overlapping structure of three stories in which they are overlaid sequentially along the ABS 30. The lower thin-film coil 110 is different in the number of multilayered coil-layers and the number of turns in each coil-layer as compared to the lower thin-film coil 10. However, the lower thin-film coil 110 has the story structure, the partially recessed structure, and the combined recessed parts structure similar with the lower thin-film coil 10. Further, the lower thin-film coil 110 has an equidistant three-stage structure in which the first, second, and third coil-layers 111, 112, 113 have the same front distance and the same rear distance.

The first coil-layer 111 has turn parts 111c, as illustrated in FIG. 25 (a), arranged between the first front shield layer 41 and the first rear shield layer 44. Further, the second coil-layer 112 has turn parts 112c, as illustrated in FIG. 25 (b), arranged between the second front shield layer 42 and the second rear shield layer 45. Further, the third coil-layer 113 has turn parts 113c, as illustrated in FIG. 25 (c), arranged between the third front shield layer 43 and the third rear shield layer 46.

The first coil-layer 111 further has a half-loop part 111b extending from a connecting part 111a connected to the second coil-layer 112 to the turn part 111c, and a loop part 111d extending from the turn part 111c to the connecting part 111e. The first coil-layer 111 is constructed as a continuous line from the connecting part 111a to the loop part 111d, so as to be wound as a flat spiral about the shield magnetic layer 40, thus forming a one-turn loop as a whole. Further, as illustrated in FIG. 27, the first coil-layer 111 is formed such that the first non-corresponding magnetic pole part 111c2 is larger in coil thickness than the first magnetic pole corresponding part 111c1. In other words, the coil thicknesses of the first magnetic pole corresponding part 111c1 and the first non-corresponding magnetic pole part 111c2 are h11 and h12 respectively, and h11<h12. Further, since the upper surface of the first magnetic pole corresponding part 111c1 is recessed with respect to the upper surface of the first non-corresponding magnetic pole part 111c2, the first coil-layer 111 has the partially recessed structure similar with the first coil-layer 11.

The second coil-layer 112 has a loop part 112d extending from a connecting part 112a connected to the first coil-layer 111 to a turn part 112c, and a half-loop part 112b extending from the turn part 112c to a connecting part 112e. The second coil-layer 112 is constructed as a continuous line from the connecting part 112a to the loop part 112b so as to be wound as a flat spiral about the shield magnetic layer 40, thus forming a one-turn loop as a whole. Further, as illustrated in FIG. 27, the second coil-layer 112 is also formed such that the second non-corresponding magnetic pole part 112c2 is larger in coil thickness than the second magnetic pole corresponding part 112c1. In other words, the coil thicknesses of the second magnetic pole corresponding part 112c1 and the second non-corresponding magnetic pole part 112c2 are h21 and h22 respectively, and h21<h22. Further, the second coil-layer 112 also has the partially recessed structure similar with the second coil-layer 12.

The third coil-layer 113 has a loop part 113d extending from a connecting part 113e connected to the second coil-layer 112 to a turn part 113c, and a half-loop part 113b extending from the turn part 113c to a connecting part 113a. The third coil-layer 113 is constructed as a continuous line from the connecting part 113e to the loop part 113b so as to be wound as a flat spiral about the shield magnetic layer 40, thus forming a one-turn loop as a whole. Further, as illustrated in FIG. 27, the third coil-layer 113 is also formed such that the third non-corresponding magnetic pole part 113c2 is larger in coil thickness than the third magnetic pole corresponding part 113c1. The coil thicknesses of the third magnetic pole corresponding part 113c1 and the third non-corresponding magnetic pole part 113c2 are h31 and h32 respectively, and h31<h32. Further, the third coil-layer 113 also has the partially recessed structure similar with the second coil-layer 112.

The first coil-layer 111, the second coil-layer 112 and the third coil-layer 113 connect with each other as follows, whereby the lower thin-film coil 110 forms a continuous 3-turn loop. Namely, the connecting part 111e is connected to the connecting part 111a through the loop part 111d, turn part 111c and half-loop part 111b, while the connecting part 111a is connected to the connecting part 112a. The connecting part 112a is further connected to the connecting part 112e through the loop part 112d, turn part 112c and half-loop part 112b, while the connecting part 112e is connected to the connecting part 113e. Further, the connecting part 113e is connected to the connecting part 113a through the loop part 113d, turn part 113c and half-loop part 113b. Thus, the 3-turn loop is formed by the lower thin-film coil 110.

Further, the lower thin-film coil 110 has the following story structure. The story structure means a structure in which the first coil-layer 111, the second coil-layer 112, and the third coil-layer 113 overlie in the vertical direction and the first magnetic pole corresponding parts 111c1, 112c1, 113c1 overlie in the vertical direction as illustrated, for example, in FIG. 27.

The lower thin-film coil 110 further has the following combined recessed parts structure. The combined recessed parts structure means a structure in which the second magnetic pole corresponding part 112c1 fits in the recessed part 111cg formed in the first magnetic pole corresponding part 111c1 and the third magnetic pole corresponding part 113c1 fits in the recessed part 112cg formed in the second magnetic pole corresponding part 112c1 as illustrated, for example, as in FIG. 27.

Subsequently, the upper thin-film coil 155 will be described. The upper thin-film coil 155 has a first coil-layer 151, a second coil-layer 152 and a third coil-layer 153 arranged at positions separated from the ABS 30, while an upper conductor group is constituted by the first coil-layer 151, the second coil-layer 152 and the third coil-layer 153. Further, the first coil-layer 151, the second coil-layer 152 and the third coil-layer 153 are arranged in the vertical direction, the upper thin-film coil 155 has an overlapping structure of three layers which the first, second, third coil-layers 151,152, 153 are overlaid sequentially along the ABS 30.

Further, the upper thin-film coil 155 has the equidistant three-stage structure and the (1+1+1) turn structure similar with the lower thin-film coil 110. The upper thin-film coil 155 has the story structure, the partially recessed structure and the combined recessed parts structure similar with the lower thin-film coil 110.

The shield magnetic layer 40 has a first front shield layer 41, a second front shield layer 42, a third front shield layer 42x, a connecting shield layer 43, a first rear shield layer 44, a second rear shield layer 45 and a third rear shield layer 46.

The first, second, third front shield layers 41, 42, 42x are arranged closer to the ABS 30 than are the first coil-layer 111, the second coil-layer 112 and the third coil-layer 113, respectively. The second front shield layer 42 overlies the first front shield layer 41, further, the third front shield layer 42x overlies the second front shield layer 42. The first, second, third front shield layers 41, 42, 42x form a three-stage structure in which their respective rear side faces farther from the ABS 30 are equidistant from the ABS 30.

The first, second, third rear shield layers 44, 45, 46 are arranged farther from the ABS 30 than are the first coil-layer 111, the second coil-layer 112 and the third coil-layer 113, respectively. The second rear shield layer 45 overlies the first rear shield layer 44, further, the third rear shield layer 46 overlies the second rear shield layer 45. The first, second, third rear shield layers 44, 45, 46 also form a three-stage structure.

The write shield layer 160 has an opposing shield layer 161,162, a first front shield layer 163, a second front shield layer 164, a third front shield layer 165, a connecting shield layer 166, a first rear shield layer 169, a second rear shield layer 168, a third rear shield layer 167 and the upper yoke layer 170, 171.

In the above-described thin-film magnetic head 310, both the lower thin-film coil 110 and the upper thin-film coil 155 has the equidistant three-stage structure, the lower thin-film coil 110 and the upper thin-film coil 155 are able to secure 3 turns respectively, while having only 1 turns per plane. This allows the thin-film magnetic head 310 to reduce the depth from the ABS 30 and make the magnetic path length shorter as similar with the thin-film magnetic head 300. Therefore, the thin-film magnetic head 310 is able to follow rapid changes in recording signals having a high frequency and changing fast. This makes the thin-film magnetic head 310 suitable as a recording head for hard disk drives mounted to servers in particular.

Further, since the thin-film magnetic head 310 can be configured such that the width of each turn part in the lower thin-film coil 110 and the upper thin-film coil 155 is made large, the heating values of the lower thin-film coil 110 and the upper thin-film coil 155 can be reduced. Therefore, it is possible to prevent protrusion of the shield magnetic layer 40 and the write shield layer 160 and thus make the thin-film magnetic head 310 approach a recording medium.

In particular, in the thin-film magnetic head 310, the low thin-film coil 110 has the story structure, the partially recessed structure, and the combined recessed parts structure as with the thin-film magnetic head 300. In the low thin-film coil 110, all of the first coil-layer 111, the second coil-layer 112, and the third coil-layer 113 are formed such that the non-corresponding magnetic pole part is larger in thickness than the magnetic pole corresponding part. Thus, parts with a larger thickness extend over substantially entirely over the low thin-film coil 110 and a part with a smaller thickness exists at a very limited position in each of the first coil-layer 111, the second coil-layer 112, and the third coil-layer 113, so that the flow of electric current is unlikely to be inhibited. Therefore, the electric resistance of the lower thin-film coil 110 can further reduce to further suppress the heating values of the first, second, and third coil-layers 111, 112, 113.

Also in the thin-film magnetic head 310, since the thin-film coil is arranged between the main magnetic pole layer 26 and the reproducing head, the interval between the reproducing head and the main magnetic pole layer 26 needs to be widened accompanying the increase in the thicknesses of the first, second, and third coil-layers 111, 112, 113. This makes it more difficult to keep RWS within a certain range than in the thin-film magnetic head 300. In this regard, in the thin-film magnetic head 310, the lower thin-film coil 110 corresponding to the substrate side coil-layer has the partially recessed structure and the combined recessed parts structure. This configuration makes it possible to further decrease the magnitude of the electric resistance of the lower thin-film coil 110 and further suppress the heating value within the restriction range of RWS also in the thin-film magnetic head 310.

Therefore, also in the thin-film magnetic head 310, the electric resistance of the lower thin-film coil 110 can be reduced within the restriction range of RWS without increasing the magnetic path length to prevent protrusion of a part of the ABS 30.

In addition, in the thin-film magnetic head 310, the lower thin-film coil 110 is formed in the one-turn three-story structure and therefore has a small number of turn parts arranged in the direction intersecting the ABS 30. Therefore, the magnetic path length can be made shorter in the thin-film magnetic head 310 than in the thin-film magnetic head 300. Accordingly, the thin-film magnetic head 310 can pass recording signals having a higher frequency than in the thin-film magnetic head 300 and increase the recording density on the recording medium.

However, the lower thin-film coil 110 has the overlapping structure of three stories and the thin-film coil becomes large in thickness as a whole and accordingly greatly affects RWS, thus making it difficult to keep RWS within the restriction range. In this regard, the thin-film coil is formed in the story structure even though it is in the overlapping structure, in which the recessed part 111cg on the lower side, the recessed part 112cg at the middle, and the recessed part 113cg on the uppermost side are arranged along the ABS 30, whereby the thickness of the affecting part in the thin-film coil can be reduced. In addition, since the lower thin-film coil 110 is formed in the combined recessed parts structure, the thickness of the affecting part in the thin-film coil is further reduced. Therefore, the effect of the thickness of the thin-film coil exerting RWS can be further effectively reduced.

As described above, the thin-film magnetic head 310 is also configured to be able to reduce the magnitude of the electric resistance of the lower thin-film coil 110 within the restriction range of RWS to suppress the heating value. Further, the thin-film magnetic head 310 achieves the excellent operation and effect capable of further shortening the magnetic path length.

Modified Example

The above-described thin-film magnetic head 300, 310 have the lower thin-film coil 10, the lower thin-film coil 110 respectively. Both the lower thin-film coil 10 and the lower thin-film coil 110 have an overlapping structure in which a plurality of coil-layers overlies in the vertical direction. As described above, since the lower thin-film coil 10, the lower thin-film coil 110 have the overlapping structure, each turn part is arranged in a direction along with the ABS 30. Therefore, this allows the thin-film magnetic head 300, 310 to make the magnetic path length shorter as compared with a single story structure (for example, a conventional PMR 400) which each turn parts are arranged only along a direction intersecting the ABS 30.

Figure 28:
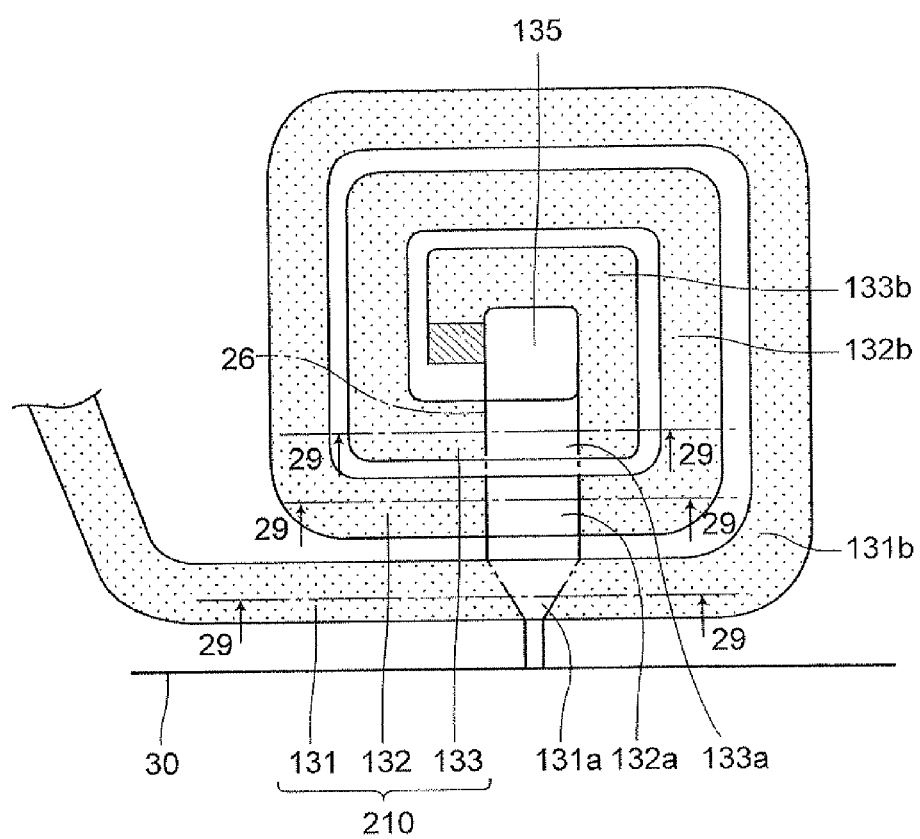
FIG. 28 is a plan view illustrating the thin-film coil of the thin-film magnetic head according to a modified example.

However, the present invention is applicable to a thin-film magnetic head which has a thin-film coil 210, as illustrated in FIG. 28. The thin-film coil 210 has three turn parts 131, 132, 133. The three turn parts 131, 132, 133 are arranged in a direction intersecting the ABS 30. The thin-film coil 210 has a plane arranged structure of single story which the turn parts do not overlay in a direction along the ABS 30.

Figure 29:
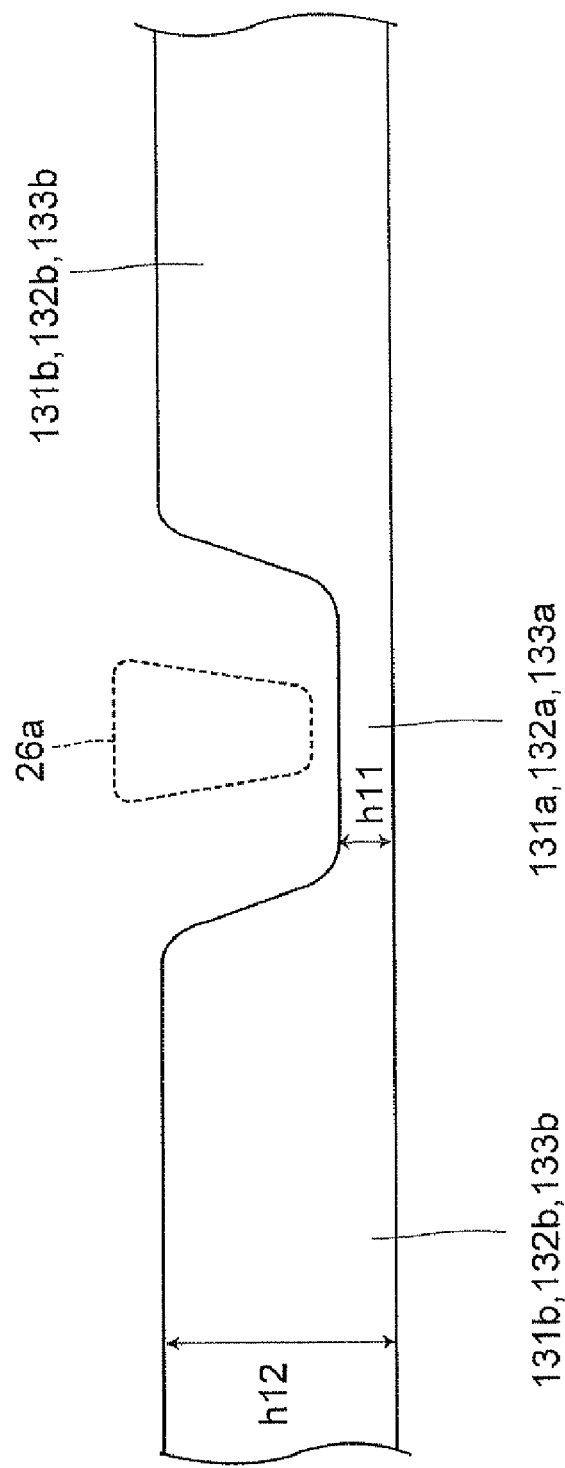
FIG. 29 is a sectional view taken along the line 29-29 in FIG. 28.

The turn parts 131, 132, 133 are wound as a flat spiral about a junction part 135 between the main magnetic pole layer 26 and the not-illustrated write shield layer. The turn parts 131, 132, 133 are formed such that the thicknesses of the non-corresponding magnetic-pole parts 131b, 132b, 133b are larger than the thicknesses of the magnetic pole corresponding parts 131a, 132a, 133a as illustrated in FIG. 29. Thus, parts with a larger thickness extend over substantially entirely over the thin-film coil 210 and a part with a smaller thickness exists at a very limited position of the thin-film coil 210, so that the electric resistance is low. In addition, the thicknesses of the magnetic pole corresponding parts 131a, 132a, 133a are small and therefore less affect RWS. Accordingly, also in the thin-film magnetic head with the thin-film coil 210, the electric resistance of the lower thin-film coil 110 can be reduced within the restriction range of RWS without increasing the magnetic path length to prevent protrusion of a part of the ABS.

Though in the thin-film magnetic head 300, 310, each number of turns of the lower thin-film coil 10, the upper thin-film coil 110 is for, three, respectively, their numbers of turns may be altered. The thin-film magnetic head 300 may have (3+3), (3+4), and (4+3) structures, for example.

Further, the upper thin-film coils 55, 155 have the story structure, the partially recessed structure, and the combined recessed parts structure. However, the upper thin-film coils 55, 155 are not the substrate side coil-layers, and therefore the upper thin-film coils 55, 155 do not need to have the story structure, the partially recessed structure, and the combined recessed parts structure.

Further, in the above-described manufacturing method of the lower thin-film coil 10, the coil thickness changing step is carried out by forming the recessed part in the surface of the corresponding part by etching. However, the coil thickness changing step may be carried out as follows.

Figure 14:
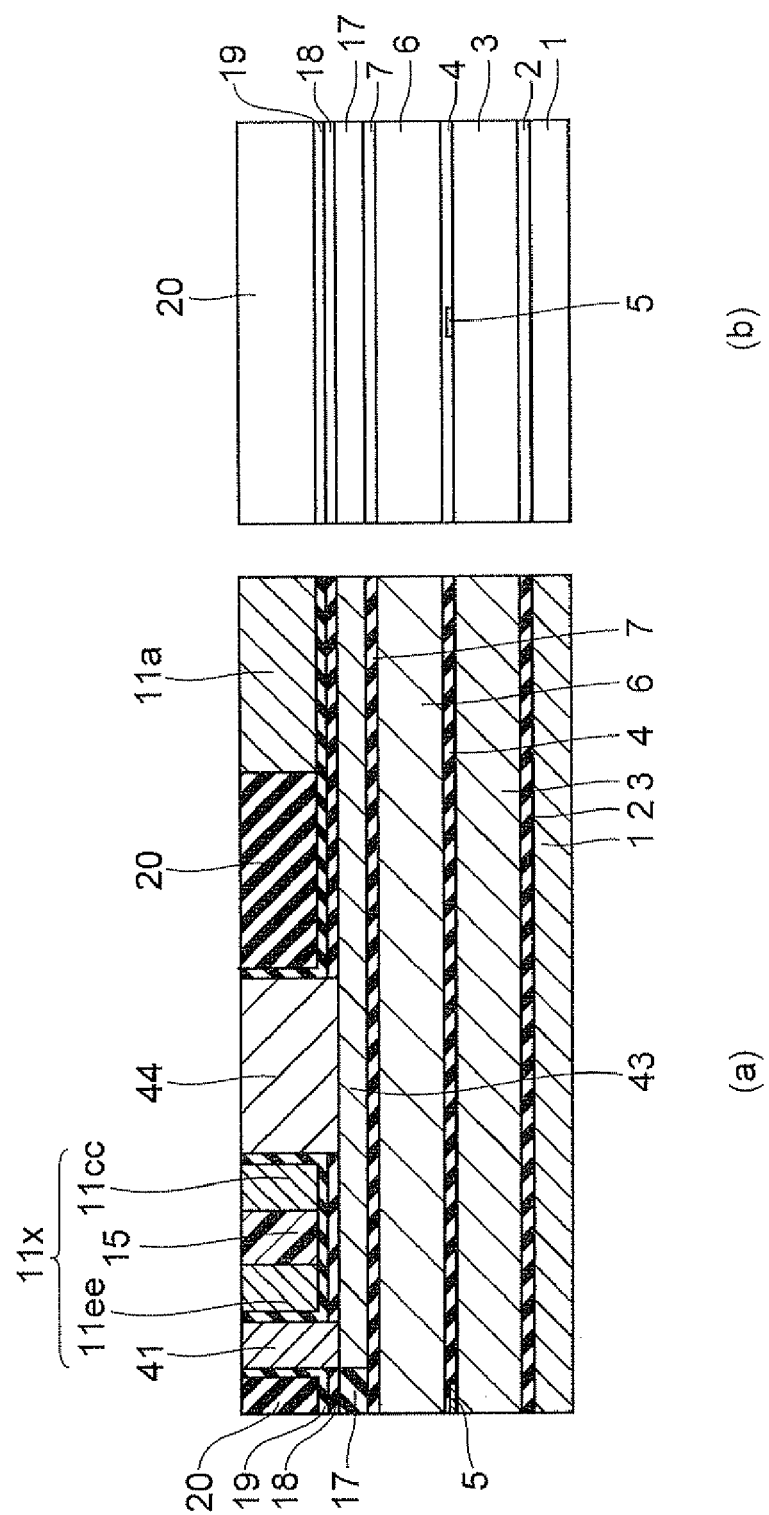
FIG. 14 illustrates a step subsequent to that of FIG. 13, in which (a) is a sectional view corresponding to FIG. 1, in which (b) is a front view corresponding to FIG. 2.
Figure 15:
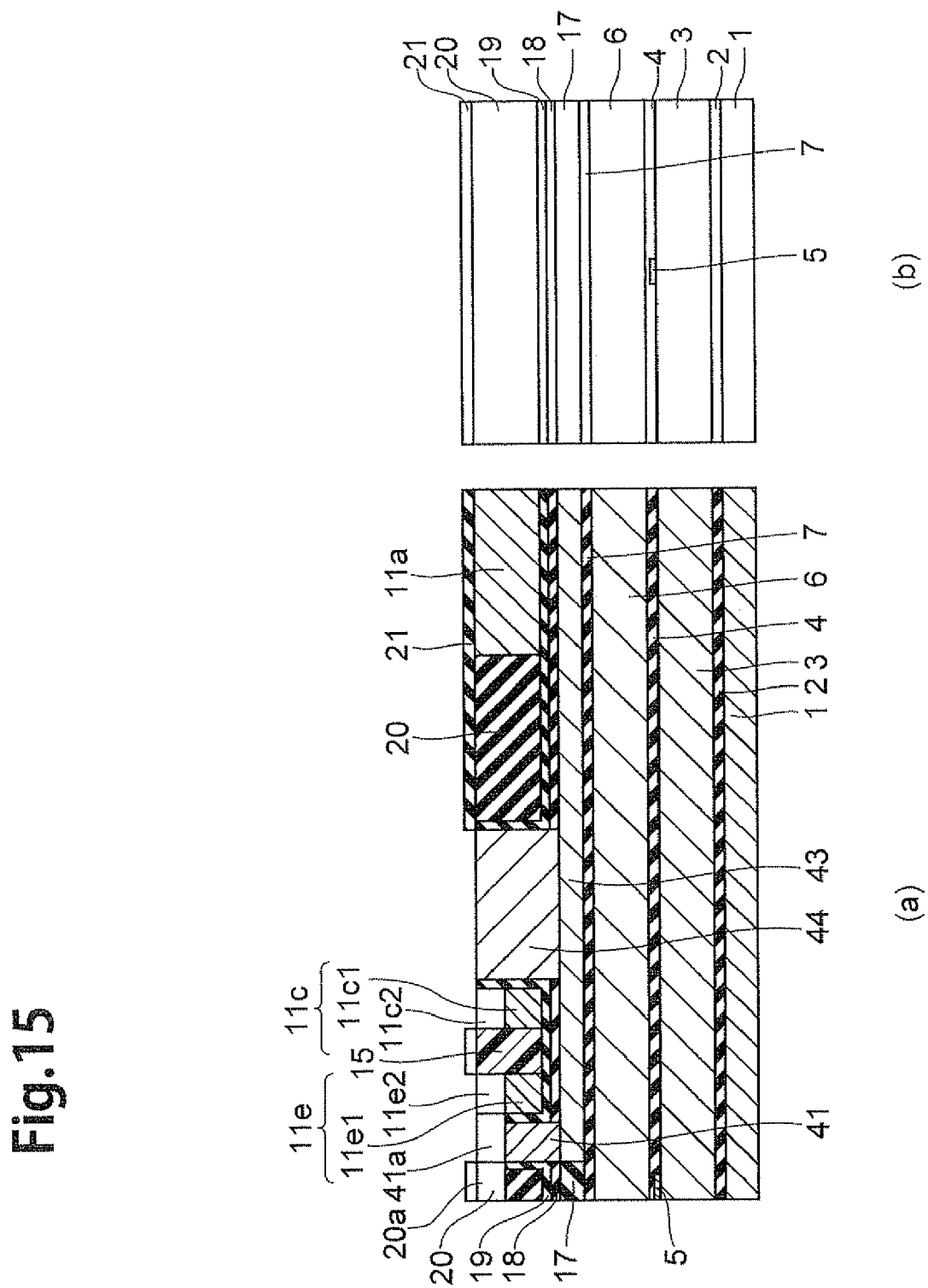
FIG. 15 illustrates a step subsequent to that of FIG. 14, in which (a) is a sectional view corresponding to FIG. 1, in which (b) is a front view corresponding to FIG. 2.
Figure 16:
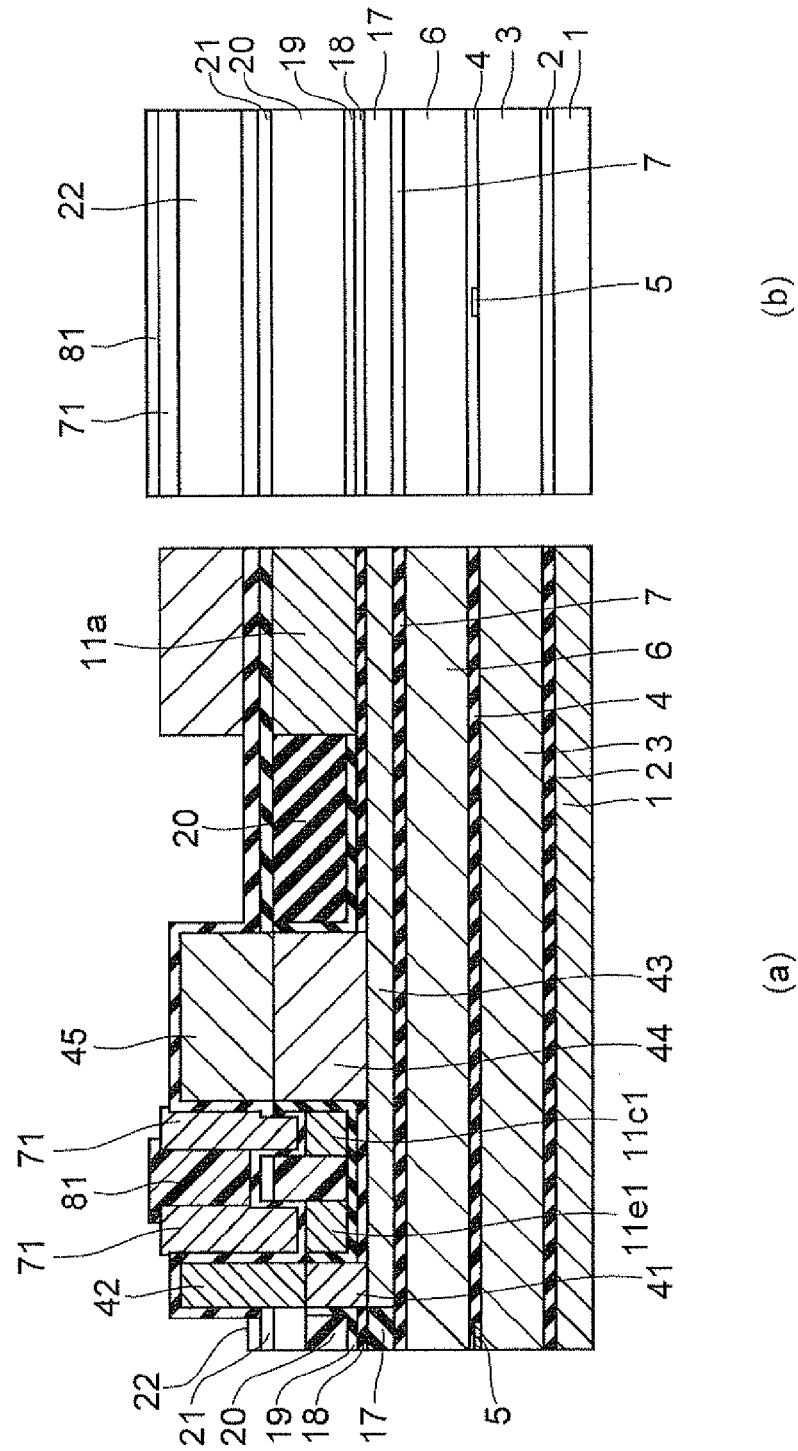
FIG. 16 illustrates a step subsequent to that of FIG. 15, in which (a) is a sectional view corresponding to FIG. 1, in which (b) is a front view corresponding to FIG. 2.
Figure 17:
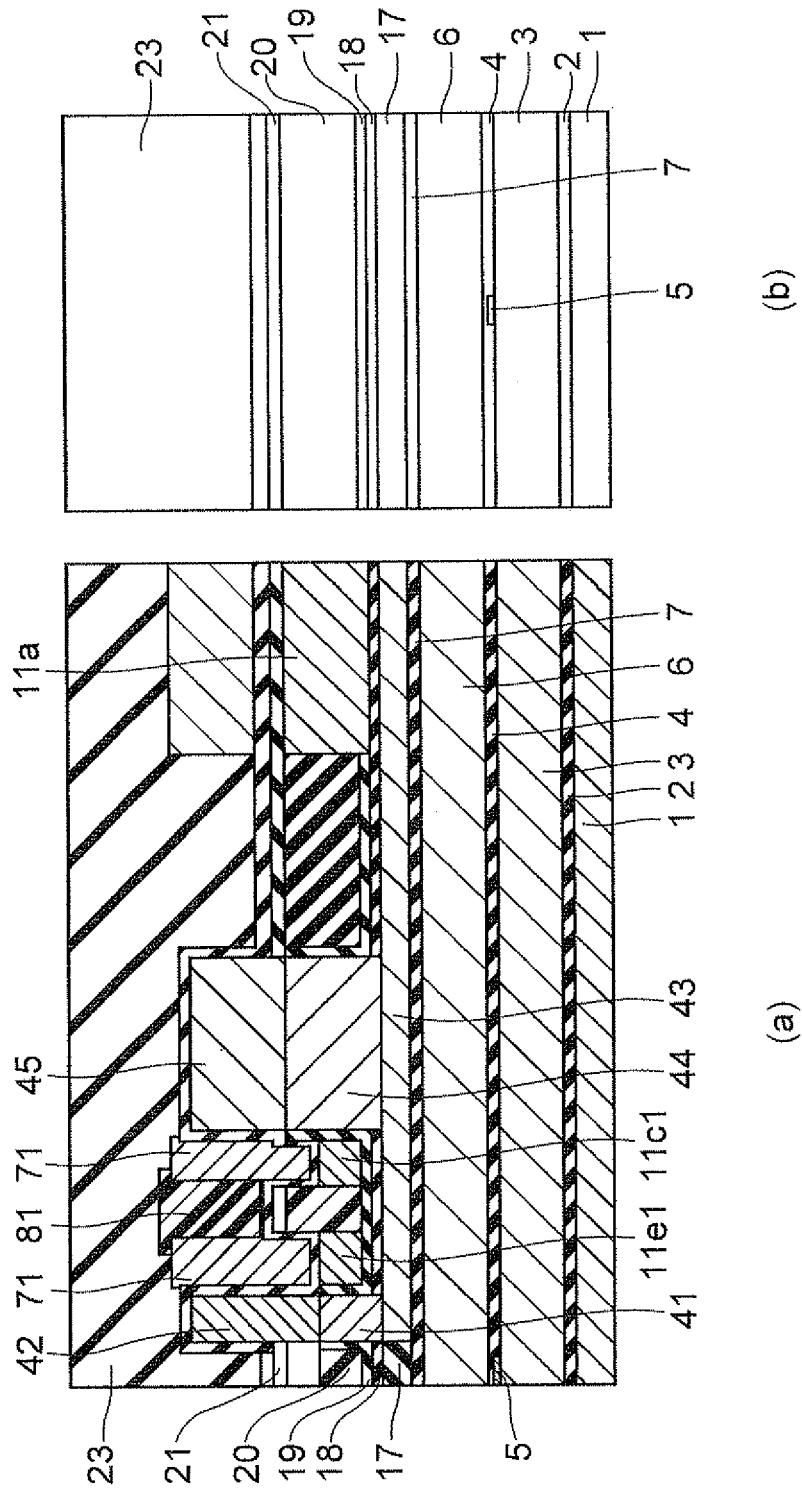
FIG. 17 illustrates a step subsequent to that of FIG. 16, in which (a) is a sectional view corresponding to FIG. 1, in which (b) is a front view corresponding to FIG. 2.
Figure 18:
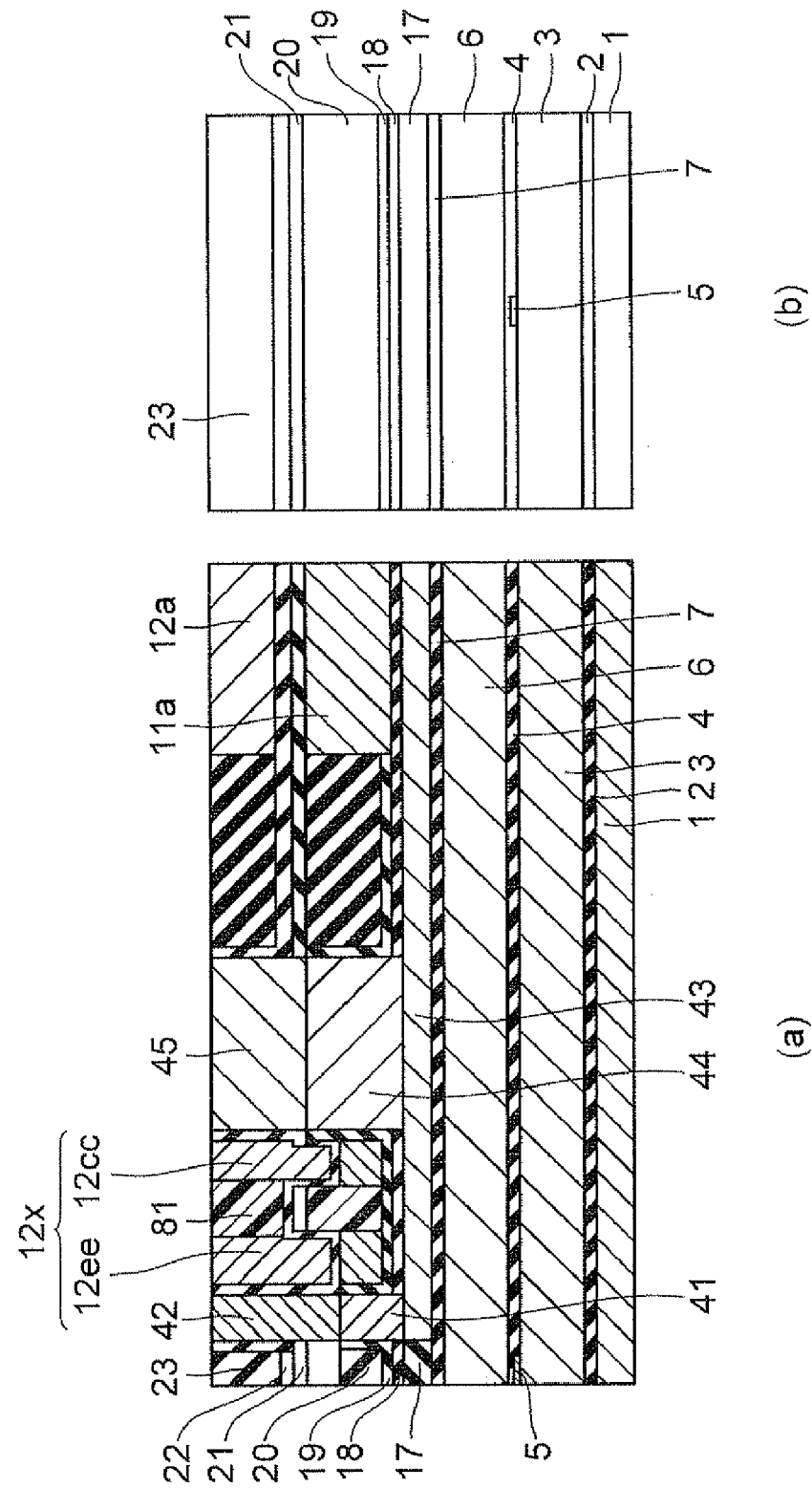
FIG. 18 illustrates a step subsequent to that of FIG. 17, in which (a) is a sectional view corresponding to FIG. 1, in which (b) is a front view corresponding to FIG. 2.
Figure 20:
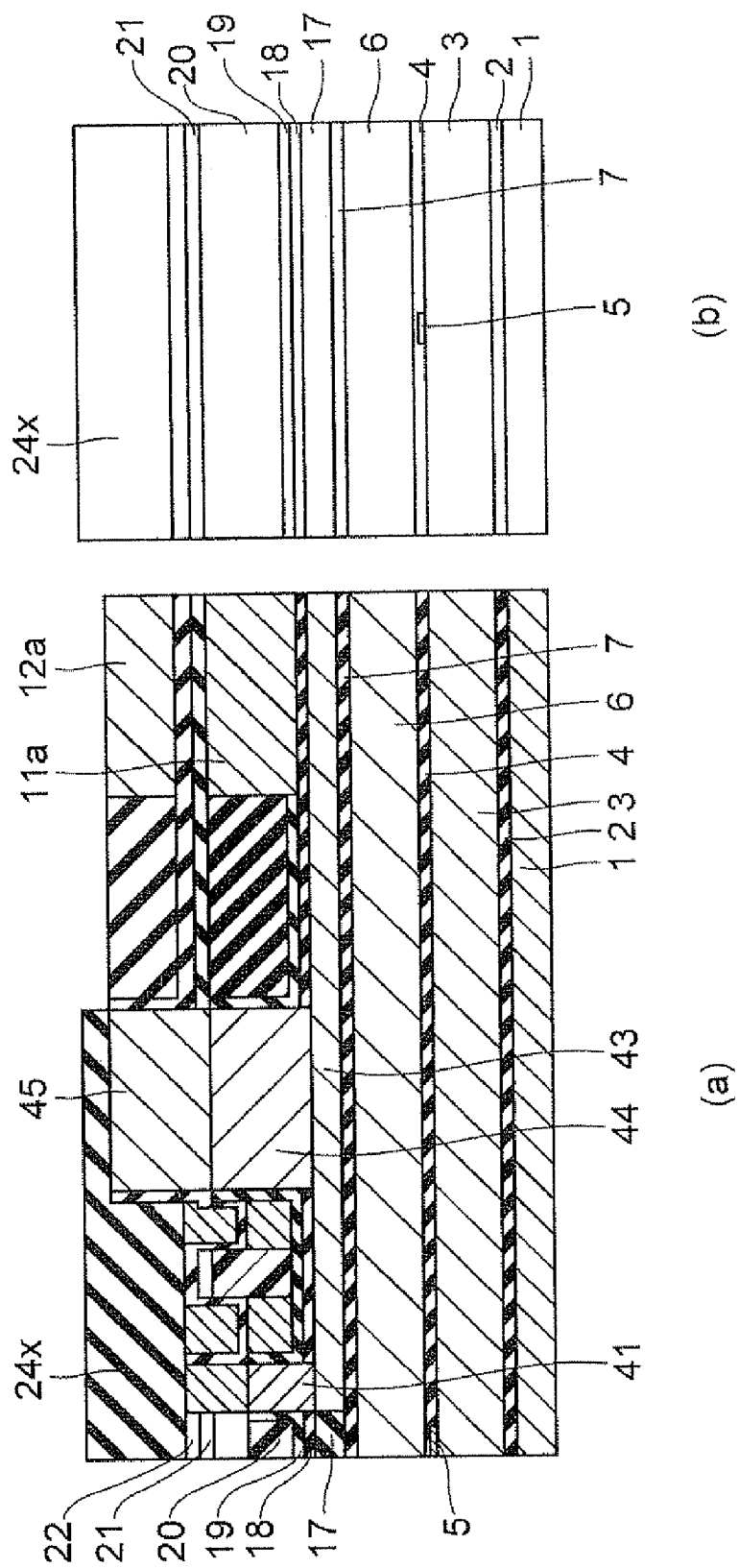
FIG. 20 illustrates a step subsequent to that of FIG. 19, in which (a) is a sectional view corresponding to FIG. 1, in which (b) is a front view corresponding to FIG. 2.
Figure 21:
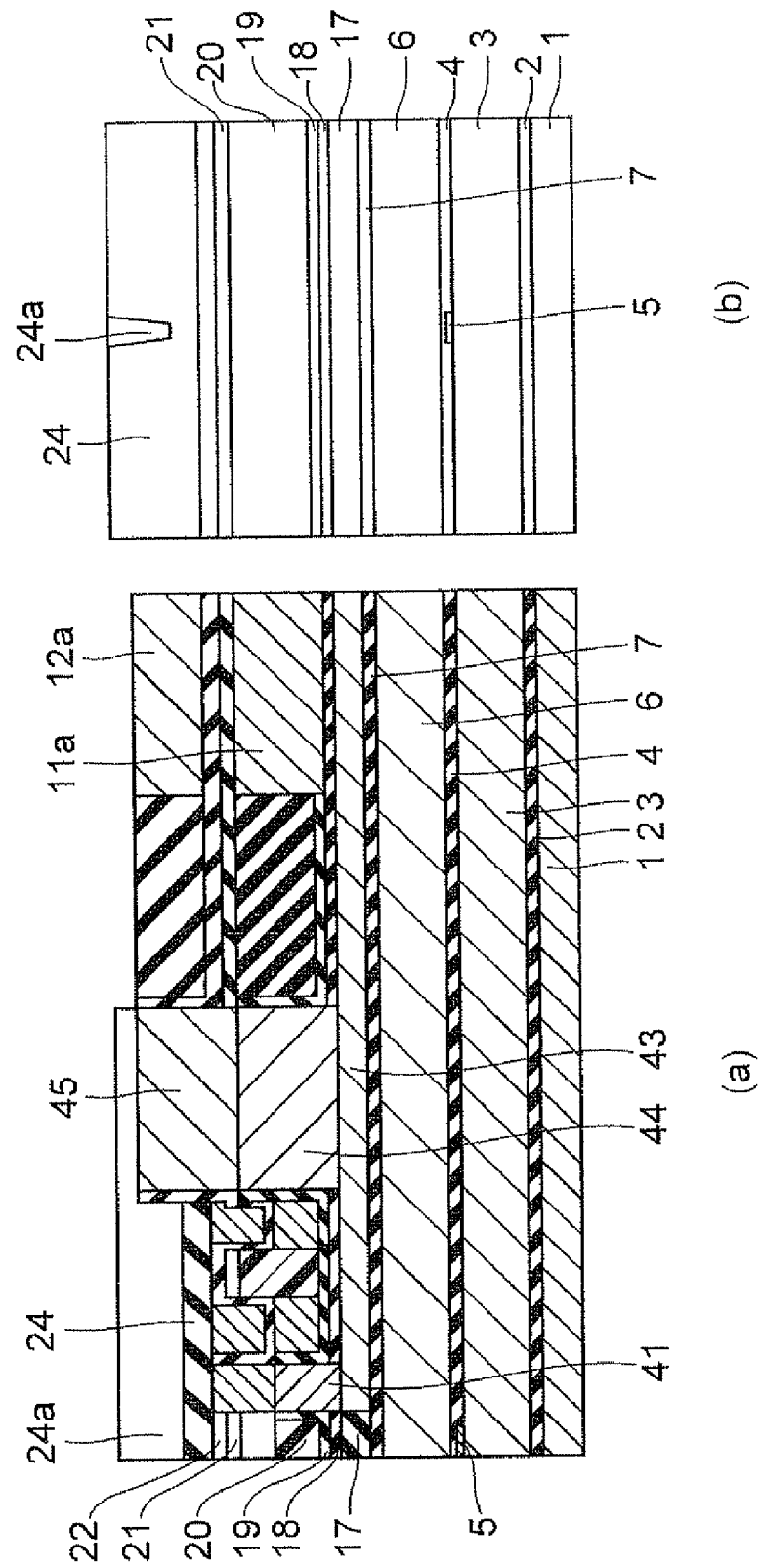
FIG. 21 illustrates a step subsequent to that of FIG. 20, in which (a) is a sectional view corresponding to FIG. 1, in which (b) is a front view corresponding to FIG. 2.
Figure 22:
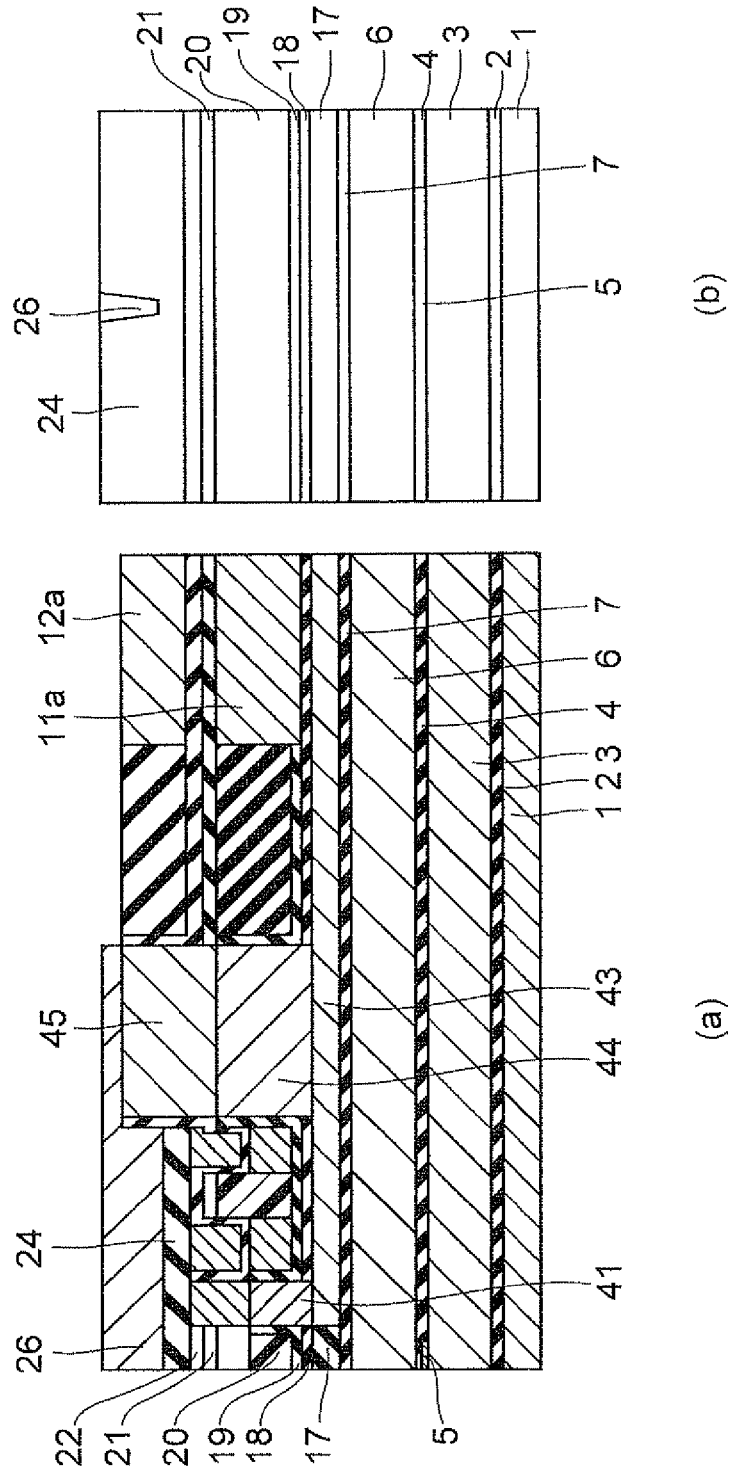
FIG. 22 illustrates a step subsequent to that of FIG. 21, in which (a) is a sectional view corresponding to FIG. 1, in which (b) is a front view corresponding to FIG. 2.
Figure 23:
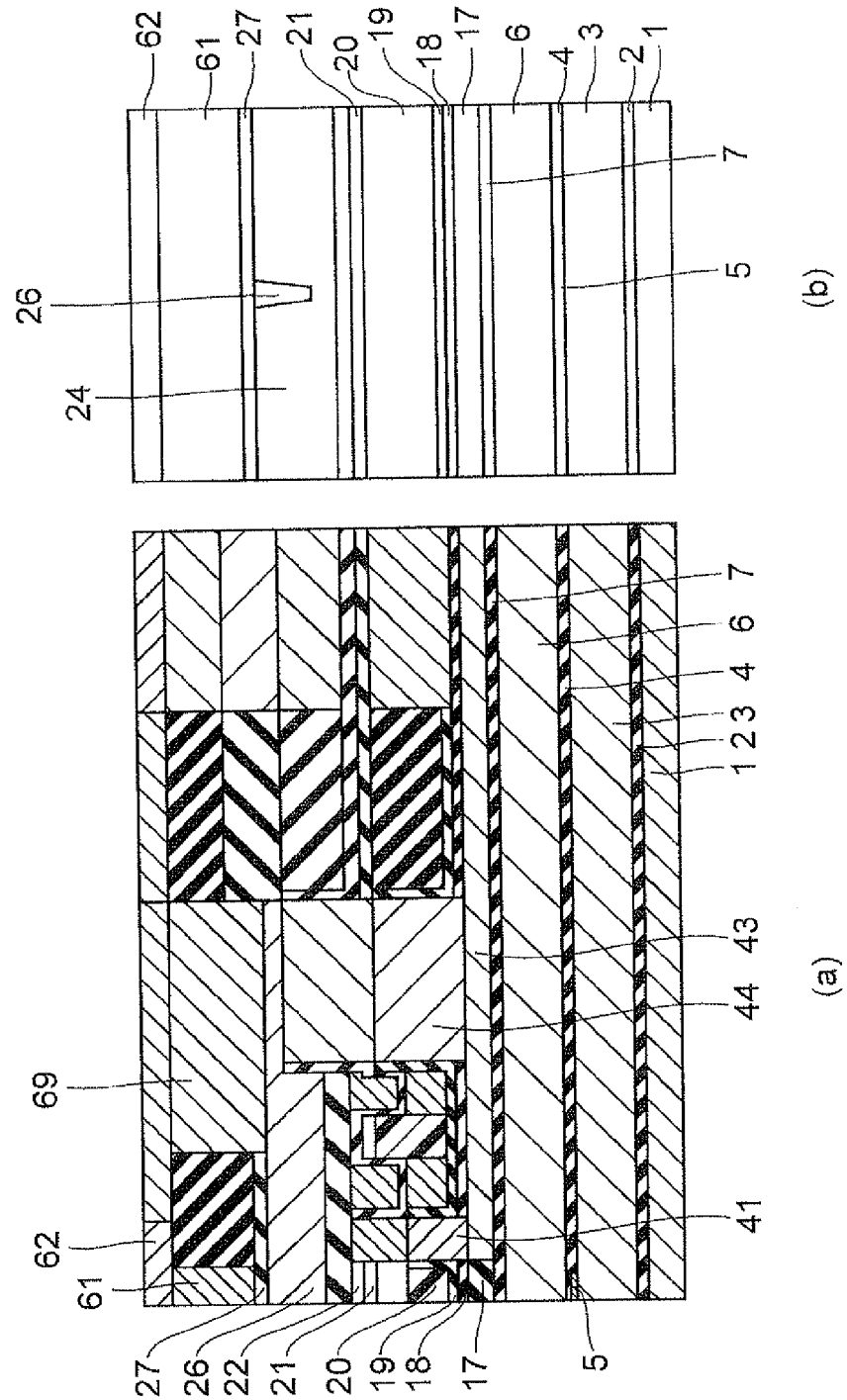
FIG. 23 illustrates a step subsequent to that of FIG. 22, in which (a) is a sectional view corresponding to FIG. 1, in which (b) is a front view corresponding to FIG. 2.

As illustrated in FIG. 14, the thickness of the conductor layer 11X is made a small thickness suitable for the magnetic pole corresponding part when the surface of the multilayer body is polished by CMP. For example, it is sufficient to perform the polish taking longer time than in the first embodiment. Then, frame plating or the like is performed on the non-corresponding magnetic pole part, and another conductor layer is laid on the surface of the non-corresponding magnetic pole part to make the non-corresponding magnetic pole part larger in thickness than the magnetic pole corresponding part. Also in this manner, the coil thickness changing step can be carried out.

Embodiments of Head Gimbal Assembly and Hard Disk Drive

Next, embodiments of the head gimbal assembly and hard disk drive will now be explained with reference to FIG. 30 to FIG. 31.

Figure 30:
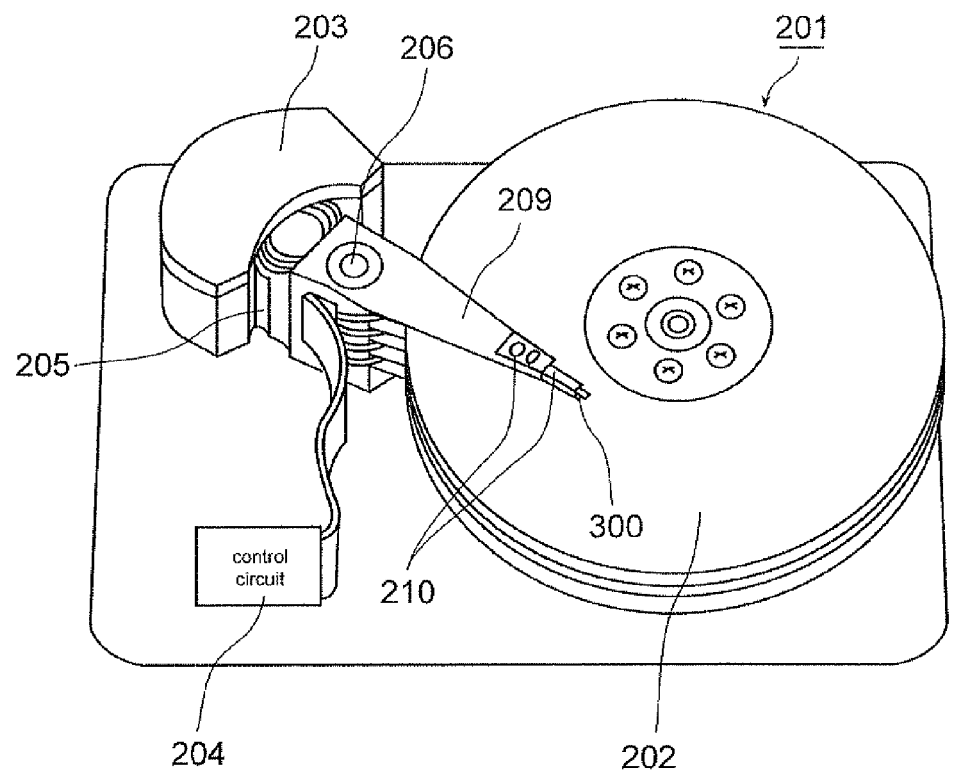
FIG. 30 is a perspective view illustrating a hard disk drive equipped with a thin-film magnetic head according to an embodiment of the present invention.
Figure 31:
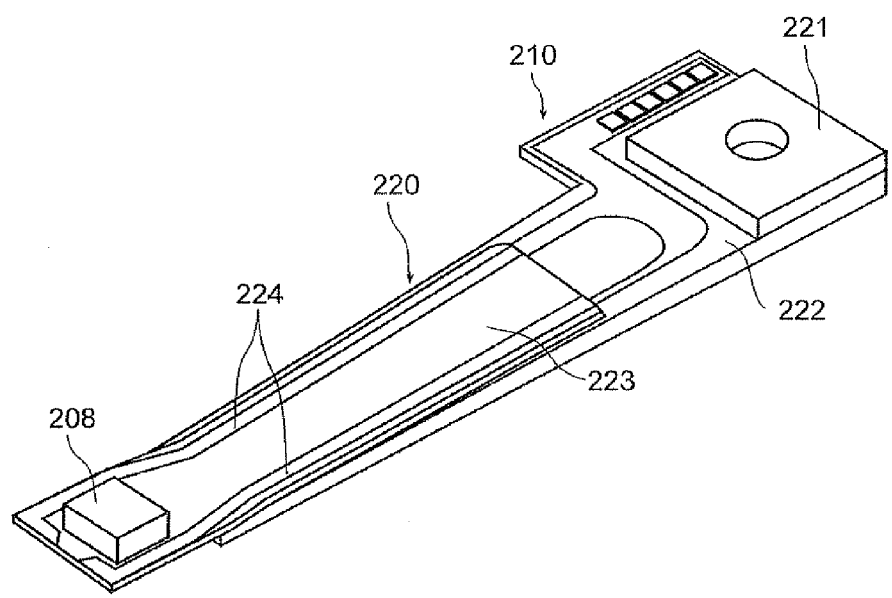
FIG. 31 is a perspective view illustrating a rear side of HGA.

FIG. 30 is a perspective view showing a hard disk drive 201 equipped with the above-mentioned thin-film magnetic head 300. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thin-film magnetic head 300.

The hard disk drive 201 positions a slider 208 on a track by an assembly carriage device 203. The thin-film magnetic head 300 is formed on this slider 208. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing.

The HGA 210 will now be described with reference to FIG. 31. FIG. 31 is a perspective view illustrating a rear face side of the HGA 210. In the HGA 210, the slider 208 is fixed to a tip portion of a suspension 220. Further, in the HGA 210, one end portion of a wiring member 224 is electrically connected to a terminal electrode of the slider 208.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 208 moves in a radial direction of the hard disk 202, i.e., a direction traversing track lines.

Such HGA 210 and hard disk drive 201 have the thin-film magnetic head 300 and therefore are able to reduce the electric resistance of the thin-film coil within the restriction range of RWS without increasing the magnetic path length and prevent protrusion of the ABS. Therefore, the flying height from the surface of the hard disk 202 is able to be reduced to make the slider 208 approach the hard disk 202.

Further, since the magnetic path length can be made shorter, the inductance of the thin-film magnetic head 300 can be reduced. Therefore, it is possible to pass recording signals having a high frequency through the thin-film coil and increase the recording density on the recording medium.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate;

wherein the thin-film coil has a coil-layer having a turn part arranged at a position closer to the medium-opposing surface than is a rear end part of the main magnetic pole layer farthest from the medium-opposing surface, and wherein supposing that the thickness of the coil-layer in a direction along the medium-opposing surface is a coil thickness and a part of the coil-layer corresponding to an arrangement space where the main magnetic pole layer is arranged is a magnetic pole corresponding part, the thin-film coil is formed such that, at least in a substrate side coil-layer arranged between the main magnetic pole layer and the substrate in the coil-layer, the coil thickness of a non-corresponding magnetic pole part that is a part other than the magnetic pole corresponding part is larger than the coil thickness of the magnetic pole corresponding part.

2. A thin-film magnetic head according to claim 1, wherein the thin-film coil has, as the turn part, a front turn part arranged at a position closest to the medium-opposing surface and a rear turn part arranged at a position farther from the medium-opposing surface than is the front turn part, and is formed such that, in each of the front turn part and the rear turn part, the coil thickness of the non-corresponding magnetic pole part is larger than the coil thickness of the magnetic pole corresponding part.

3. A thin-film magnetic head according to claim 1, wherein a bottom surface arranged on the substrate side of the main magnetic pole layer is arranged at a position closer to the substrate than is an upper surface on the side farther from the substrate of the substrate side coil-layer.

4. A thin-film magnetic head according to claim 1, further comprising:

a bottom insulating layer in contact with an upper surface of the magnetic pole corresponding part, wherein the main magnetic pole layer is formed on the upper surface of the bottom insulating layer.

5. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate;

wherein the thin-film coil has a first coil-layer and a second coil-layer respectively having a first turn part and a second turn part arranged at positions closer to the medium-opposing surface than is a rear end part of the main magnetic pole layer farthest from the medium-opposing surface, and wherein supposing that the thicknesses of the first coil-layer and the second coil-layer in a direction along the medium-opposing surface are a first coil thickness and a second coil thickness respectively and parts of the first coil-layer and the second coil-layer corresponding to arrangement spaces where the main magnetic pole layer is arranged are a first magnetic pole corresponding part and a second magnetic pole corresponding part respectively, the thin-film coil is formed such that, at least in a first substrate side coil-layer and a second substrate side coil-layer arranged between the main magnetic pole layer and the substrate in the first coil-layer and the second coil-layer, the first coil thickness and the second coil thickness of a first non-corresponding magnetic pole part and a second non-corresponding magnetic pole part that are parts other than the first magnetic pole corresponding part and the second magnetic pole corresponding part are larger than the first coil thickness and the second coil thickness of the first magnetic pole corresponding part and the second magnetic pole corresponding part.

6. A thin-film magnetic head according to claim 5, wherein the thin-film coil has a story structure in which the first coil-layer and the second coil-layer overlie in the vertical direction along the medium-opposing surface, and the first magnetic pole corresponding part and the second magnetic pole corresponding part overlie in the vertical direction along the medium-opposing surface.

7. A thin-film magnetic head according to claim 6, wherein the thin-film coil has a partially recessed structure in which upper surfaces of the first magnetic pole corresponding part and the second magnetic pole corresponding part are recessed with respect to upper surfaces of the first non-corresponding magnetic pole part and the second non-corresponding magnetic pole part, and has a combined recessed parts structure in which the second magnetic pole corresponding part fits in a first recessed part formed in the first magnetic pole corresponding part.

8. A thin-film magnetic head according to claim 6, wherein the thin-film coil has, as the first turn part, a first front turn part arranged at a position closest to the medium-opposing surface and a first rear turn part arranged at a position farther from the medium-opposing surface than is the first front turn part and, as the second turn part, a second front turn part arranged at a position closest to the medium-opposing surface and a second rear turn part arranged at a position farther from the medium-opposing surface than is the second front turn part, and is formed such that, in each of the first front turn part and the first rear turn part, the first coil thickness of the first non-corresponding magnetic pole part is larger than the first coil thickness of the first magnetic pole corresponding part and, in each of the second front turn part and the second rear turn part, the second coil thickness of the second non-corresponding magnetic pole part is larger than the second coil thickness of the second magnetic pole corresponding part.

9. A thin-film magnetic head according to claim 5, wherein the thin-film coil has an upper conductor group and a lower conductor group arranged at positions equidistant from the medium-opposing surface and opposing each other through the main magnetic pole layer, and the upper conductor group and the lower conductor group have the first coil-layer and the second coil-layer respectively.

10. A thin-film magnetic head according to claim 5, wherein a bottom surface arranged on the substrate side of the main magnetic pole layer is arranged at a position closer to the substrate than are uppermost surfaces on the side farthest from the substrate of the first substrate side coil-layer and the second substrate side coil-layer.

11. A thin-film magnetic head according to claim 5, further comprising:
a bottom insulating layer in contact with uppermost surfaces on the side farthest from the substrate of the first magnetic pole corresponding part and the second magnetic pole corresponding part, wherein the main magnetic pole layer is formed on the upper surface of the bottom insulating layer.

12. A thin-film magnetic head according to claim 5, wherein the thin-film coil further has a third coil-layer having a third turn part arranged at a position closer to the medium-opposing surface than is the rear end part of the main magnetic pole layer, and
wherein supposing that the thickness of the third coil-layer in a direction along the medium-opposing surface is a third coil thickness and a part of the third coil-layer corresponding to the arrangement space is a third magnetic pole corresponding part, the thin-film coil is formed such that, at least in a third substrate side coil-layer arranged between the main magnetic pole layer and the substrate in the third coil-layer, the third coil thickness of a third non-corresponding magnetic pole part that is a part other than the third magnetic pole corresponding part is larger than the third coil thickness of the third magnetic pole corresponding part.

13. A head gimbal assembly comprising a thin-film magnetic head formed on a support and a gimbal for securing the support;
wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate;
wherein the thin-film coil has a coil-layer having a turn part arranged at a position closer to the medium-opposing surface than is a rear end part of the main magnetic pole layer farthest from the medium-opposing surface, and
wherein supposing that the thickness of the coil-layer in a direction along the medium-opposing surface is a coil thickness and a part of the coil-layer corresponding to an arrangement space where the main magnetic pole layer is arranged is a magnetic pole corresponding part, the thin-film coil is formed such that, at least in a substrate side coil-layer arranged between the main magnetic pole layer and the substrate in the coil-layer, the coil thickness of a non-corresponding magnetic pole part that is a part other than the magnetic pole corresponding part is larger than the coil thickness of the magnetic pole corresponding part.

14. A hard disk drive comprising a head gimbal assembly having a thin-film magnetic head and a recording medium opposing the thin-film magnetic head;
wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound around any of the main magnetic pole layer, the write shield layer or a shield magnetic layer connected the main magnetic pole layer are laminated on a substrate;
wherein the thin-film coil has a coil-layer having a turn part arranged at a position closer to the medium-opposing surface than is a rear end part of the main magnetic pole layer farthest from the medium-opposing surface, and
wherein supposing that the thickness of the coil-layer in a direction along the medium-opposing surface is a coil thickness and a part of the coil-layer corresponding to an arrangement space where the main magnetic pole layer is arranged is a magnetic pole corresponding part, the thin-film coil is formed such that, at least in a substrate side coil-layer arranged between the main magnetic pole layer and the substrate in the coil-layer, the coil thickness of a non-corresponding magnetic pole part that is a part other than the magnetic pole corresponding part is larger than the coil thickness of the magnetic pole corresponding part.

* * * * *

UNITED STATES PATENT AND TRADEMARK OFFICE
CERTIFICATE OF CORRECTION

PATENT NO. : 8,358,487 B2
APPLICATION NO. : 12/984793
DATED : January 22, 2013
INVENTOR(S) : Yoshitaka Sasaki et al.

It is certified that error appears in the above-identified patent and that said Letters Patent is hereby corrected as shown below:

Please amend the title page as follows:

Item (54), and in the Specification, column 1 please change "Thin-Film Magnetic Head Having Coil of Varying Thinknesses In Spaces..." to --Thin-Film Magnetic Head Having Coil of Varying Thicknesses In Spaces...-- and Item (73), please change "Headway Technologies, Inc., Milpitas;" to --Headway Technologies, Inc., Milpitas, CA (US);--.

Signed and Sealed this
Thirtieth Day of April, 2013

Teresa Stanek Rea
*Acting Director of the United States Patent and Trademark Office*